United States Patent
Tyler et al.

(10) Patent No.: US 10,269,004 B2
(45) Date of Patent: *Apr. 23, 2019

(54) QR CODE-ENABLED P2P PAYMENT SYSTEMS AND METHODS

(71) Applicant: mFoundry, Inc., Larkspur, CA (US)

(72) Inventors: Don W. Tyler, Mill Valley, CA (US); Jeff Isenhart, Santa Rosa, CA (US); Anne Mueller, San Rafael, CA (US); Christoph Sadil, Larkspur, CA (US)

(73) Assignee: MFoundry, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/810,392

(22) Filed: Nov. 13, 2017

(65) Prior Publication Data
US 2018/0075441 A1  Mar. 15, 2018

Related U.S. Application Data

(63) Continuation of application No. 14/071,900, filed on Nov. 5, 2013, now Pat. No. 9,852,417.

(60) Provisional application No. 61/722,656, filed on Nov. 5, 2012.

(51) Int. Cl.
  *G06Q 20/32*  (2012.01)
  *G06Q 20/10*  (2012.01)

(52) U.S. Cl.
  CPC ......... *G06Q 20/3226* (2013.01); *G06Q 20/10* (2013.01); *G06Q 20/32* (2013.01); *G06Q 20/3274* (2013.01); *G06Q 20/3276* (2013.01)

(58) Field of Classification Search
  None
  See application file for complete search history.

(56) References Cited

U.S. PATENT DOCUMENTS

| | | |
|---|---|---|
| 2006/0036863 A1 | 2/2006 | Miller et al. |
| 2012/0209749 A1 | 8/2012 | Hammad et al. |
| 2013/0151400 A1 | 6/2013 | Makhotin et al. |
| 2013/0346302 A1 | 12/2013 | Purves et al. |
| 2014/0115708 A1 | 4/2014 | Terwilliger et al. |
| 2014/0289107 A1 | 9/2014 | Moshal |

*Primary Examiner* — Joseph W. King
(74) *Attorney, Agent, or Firm* — Finnegan, Henderson, Farabow, Garrett & Dunner LLP

(57) ABSTRACT

Systems and methods are provided for facilitating peer-to-peer payment transactions using mobile devices. According to certain embodiments, a financial account for providing funds for a payment transaction is determined. User input including a payment amount for the payment transaction is received and a QR code that represents the payment amount is generated. The QR code is displayed on the display of a mobile device for purposes of scanning and processing by a second mobile device.

16 Claims, 16 Drawing Sheets

QR CODE-ENABLED P2P PAYMENT SYSTEMS AND METHODS

CROSS REFERENCE TO RELATED APPLICATION(S)

This application is a continuation of U.S. patent application Ser. No. 14/071,900, filed Nov. 5, 2013, now allowed, which claims the benefit of priority of U.S. Provisional Application No. 61/722,656, filed Nov. 5, 2012, the disclosures of which are expressly incorporated herein by reference in their entirety.

BACKGROUND

I. Technical Field

The present disclosure generally relates to peer-to-peer ("P2P") payment systems and methods. In particular, the present disclosure relates to systems and methods for carrying out quick response ("QR") code-enabled P2P payment transactions.

II. Background Information

In-person money transfers typically require the use of cash or checks. However, if two parties desire to conduct a transaction, it can be difficult to complete the transaction if the parties do not have cash on hand. The use of checks eliminates the necessity of having cash on hand, but checks are often time-consuming, inconvenient, and lack security measures. Other alternative options, such as money transfers using existing electronic banking systems (e.g., via electronic wire transfer) are often more useful for transfers of large sums of money. For transfers of smaller sums of money, existing electronic banking systems are often costly and inconvenient. Therefore, there is a need for improved systems and methods that overcome the problems of cost and inconvenience associated with typical payment options.

SUMMARY

Consistent with a disclosed embodiment, a computer-implemented method is provided for completing a peer-to-peer payment transaction. The method includes determining, by a processor, a financial account for providing funds for the payment transaction. Further, the method comprises receiving, by the processor, a user input comprising a payment amount for the payment transaction. The method also includes generating, by the processor, a QR code comprising a representation of the payment amount, and displaying, by the processor, the QR code on a display of the mobile device.

Consistent with a disclosed embodiment, an apparatus comprising a mobile device is provided for completing a peer-to-peer payment transaction, wherein the mobile device comprises a display, a memory storing instructions, and a processor configured to execute the instructions. The processor is configured to execute the instructions to determine a financial account for providing funds for a payment transaction. Also, the processor is configured to execute the instructions to receive a user input comprising a payment amount for the payment transaction. The processor is further configured to execute the instructions to generate a QR code comprising a representation of the payment amount, and to display the QR code on the display.

Consistent with a disclosed embodiment, a computer-implemented method is provided for completing a peer-to-peer payment transaction using a mobile device comprising at least one processor and a camera. The method comprises configuring, by the processor, the camera to scan one or more QR codes. Further, the method includes scanning, by the camera, a QR code, wherein the QR code comprises data representing a payment transaction. The method additionally comprises determining, by the processor, that the scanning of the QR code is completed. The method further includes displaying, on a display associated with the mobile device, a notification that the scanning of the QR code is completed. Also, the method comprises transmitting, by the processor, the data representing the payment transaction to a server, wherein the data is obtained from the scanned QR code.

Consistent with a disclosed embodiment, an apparatus comprising a mobile device is provided for completing a peer-to-peer payment transaction, wherein the mobile device comprises a display, a camera, a memory storing instructions, and a processor configured to execute the instructions. The processor is configured to execute the instructions to configure the camera to scan one or more QR codes. Further, the processor is configured to execute the instructions to scan, by the camera, a QR code, wherein the QR code comprises data representing a payment transaction. The processor is additionally configured to execute the instructions to determine that the scanning of the QR code is completed. Also, the processor is configured to execute the instructions to display a notification that the scanning of the QR code is completed on the display. The processor is further configured to transmit the data representing the payment transaction to a server, wherein the data is obtained from the scanned QR code.

Consistent with a disclosed embodiment, a system is provided for processing a peer-to-peer payment transaction using mobile devices, wherein the system comprises a memory storing instructions and a processor configured to execute the instructions. The processor is configured to execute the instructions to receive a transmission from a mobile device comprising data representing a payment transaction, wherein the data is obtained from a scanned QR code. Additionally, the processor is configured to execute the instructions to analyze information contained within the data representing the payment transaction, wherein the information comprises at least an amount of the payment transaction, the identity of a financial institution associated with a financial account that is the source of the funds for the transaction, and the identity of a financial institution associated with a financial account that is the destination of the funds for the transaction. The processor is further configured to execute the instructions to determine that the financial institution associated with a financial account that is the source of the funds for the transaction authorizes the transaction. Also, the processor is configured to execute the instructions to request the funds for the transaction from the financial institution associated with a financial account that is the source of the funds for the transaction. The processor also is configured to execute the instructions to transmit the funds for the transaction to the financial institution associated with a financial account that is the destination of the funds for the transaction.

Consistent with other disclosed embodiments, tangible, non-transitory computer-readable storage media may store program instructions, which are executed by a processor and perform any of the methods described herein.

It is to be understood that both the foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings.

DETAILED DESCRIPTION

Figure 1:
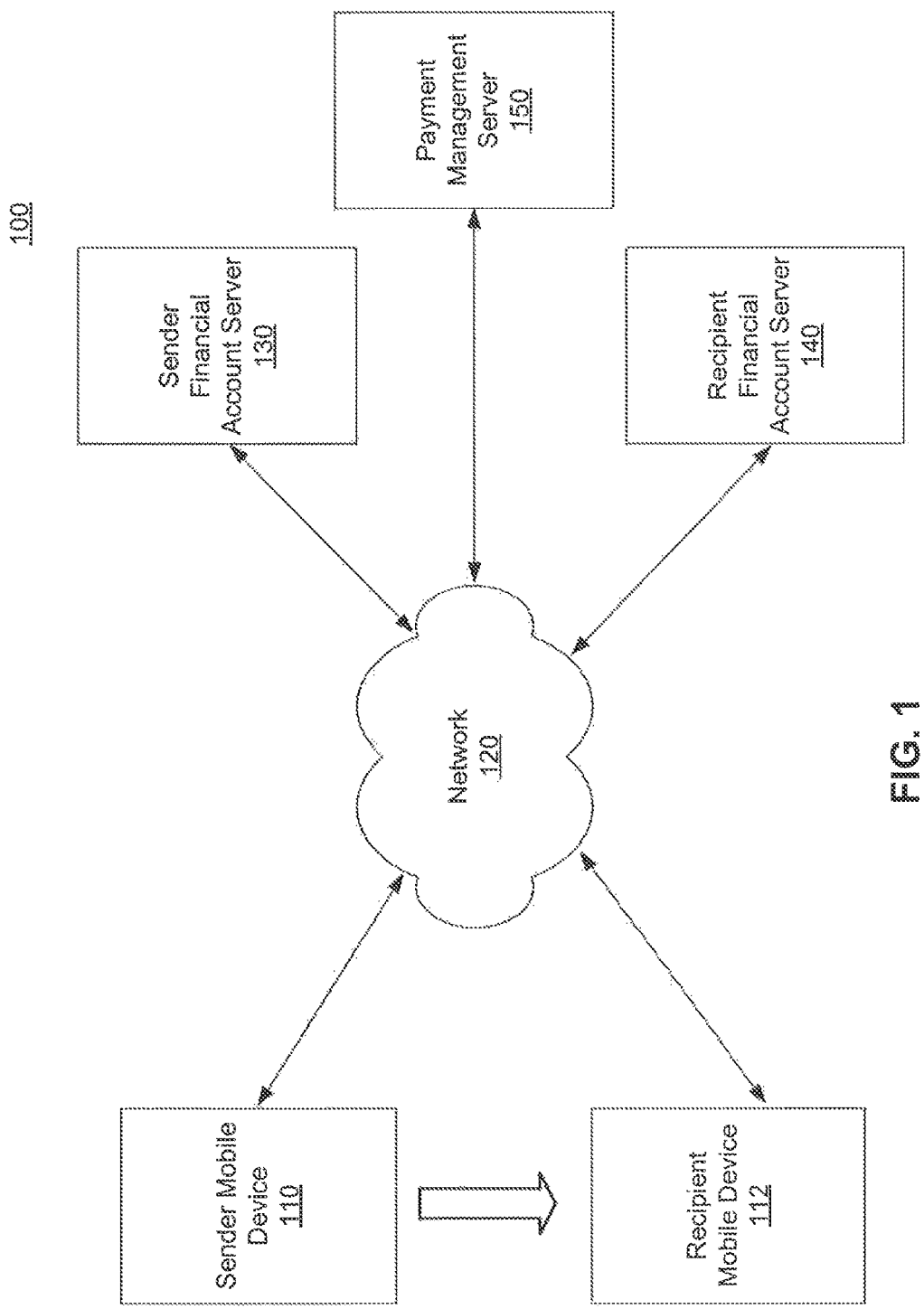
FIG. 1 is a diagram of an example of a system for providing a peer-to-peer payment transaction using mobile devices.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limiting of the disclosed embodiments. Instead, the proper scope is defined by the appended claims.

Disclosed embodiments provide systems and methods for peer-to-peer payment transactions. Specifically, the disclosed systems and methods enable a QR code-enabled P2P payment transaction between a sender and a recipient. The parties may conduct the transaction via a communication between a first mobile device (i.e., a device of the sender) and a second mobile device (i.e., a device of the recipient). For example, the first mobile device may display a QR code representing the payment transaction and the communication may include the second mobile device reading the QR code displayed on the first mobile device. Accordingly, the reading of the QR code may result in the transfer of the payment from a financial services account of the sender to a financial services account of the recipient.

FIG. 1 is an example illustration of a system 100 for providing peer-to-peer payment transactions using mobile devices, consistent with a disclosed embodiment. As shown in system 100, a sender mobile device 110, a recipient mobile device 112, a sender financial account server 130, a recipient financial account server 140, and a payment management server 150 are configured to communicate over a network 120.

One of skill in the art will appreciate that although two mobile devices, two financial instruction banking systems, and one payment and account management system are depicted in FIG. 1, any number of these components may be provided. Furthermore, one of ordinary skill in the art will recognize that one or more components of system 100 may be combined and/or divided into subcomponents. For example, functionality provided by payment management server 150 and sender financial account server 130 and/or recipient financial account server 140 may be combined. In some embodiments, sender financial account server 130 and recipient financial account server 140 may be provided by and/or host financial accounts of the same entity. For example, the financial account providing the sender's transferred funds and the recipient's financial account receiving the funds may be provided by the same financial services account provider, and may therefore use the same system architecture. In some embodiments, payment management server 150 may also be the same entity as financial account server 130 and recipient financial account server 140.

Network 120 provides communications between the various components in system 100, such as sender mobile device 110, recipient mobile device 112, sender financial account server 130, recipient financial account server 140, and payment management server 150. In addition, the components in system 100 may access legacy systems (not shown) via network 120, or may directly access legacy systems, data stores, or other network applications. Network 120 may be a shared, public, or private network, may encompass a wide area or local area, and may be implemented through any suitable combination of wired and/or wireless communication networks. Network 120 may further comprise an intranet or the Internet.

Sender mobile device 110 and recipient mobile device 112 may each be any type of mobile device for communicating with one another and/or other components of system 100 over network 120. For example, a user of sender mobile device 110 may transmit data to and/or receive data from recipient mobile device 112 and/or payment management server 150. Similarly, a user of recipient mobile device 112 may transmit data to and/or receive data from sender mobile device 110 and/or payment management server 150. Sender mobile device 110 and recipient mobile device 112 may be smartphones, tablets, smart watches, or any other appropriate mobile computing platform or device capable of exchanging data with network 120.

Sender financial account server 130 may store data representing a financial account associated with a user of sender mobile device 110. Similarly, recipient financial account server 140 may store data representing a financial account associated with a user of recipient mobile device 112. Sender financial institution server 130 and recipient financial institution server 140 may be provided by financial institutions, such as banking, credit, and/or debit processing institutions. Financial accounts stored maintained by sender financial account server 130 and recipient financial account server 140 may include checking, savings, credit, PayPal®, or other financial accounts.

Although separate sender and recipient financial account servers are shown in FIG. 1, as described above, one of ordinary skill in the art will appreciate that one financial account server (e.g., financial account server 140) may store financial accounts for both a sender and a recipient who conduct a payment transaction using sender mobile device 110 and recipient mobile device 112, respectively.

Payment management server 150 may provide funds transfers from a financial account associated with a user of sender mobile device 110 to a financial account associated with a user of recipient mobile device 112. For example, in response to a request from sender mobile device 110, payment management server 150 may transmit data comprising a QR code to sender mobile device 110. The data comprising the QR code may represent a payment or a funds transfer. Sender mobile device 110 may display the QR code and recipient mobile device 112 may scan or otherwise read the QR code. Recipient mobile device 112 may read the QR code that is displayed by sender mobile device 110. Further, payment management server 150 may receive data from recipient mobile device 112 indicating that recipient mobile device 112 read the QR code. Accordingly, payment management server 150 may initiate a transfer of funds from a financial account associated with a user of sender mobile device 110 to a financial account associated with a user of recipient mobile device 112.

As discussed above, financial accounts associated with users of sender mobile device 110 and recipient mobile device 112 may be provided by sender financial account server 130 and recipient financial account server 140. Accordingly, payment management server 150 may act as an intermediary and facilitate the processing of a transaction resulting in the transfer of a payment amount from the financial account associated with the user of sender mobile device 110 to the financial account associated with the user of recipient mobile device 112. Alternatively, in other embodiments, payment management server 150 may provide and/or maintain financial accounts of the sender and/or recipient. Further details describing the operating of payment management server 150 are discussed below.

Figure 2:
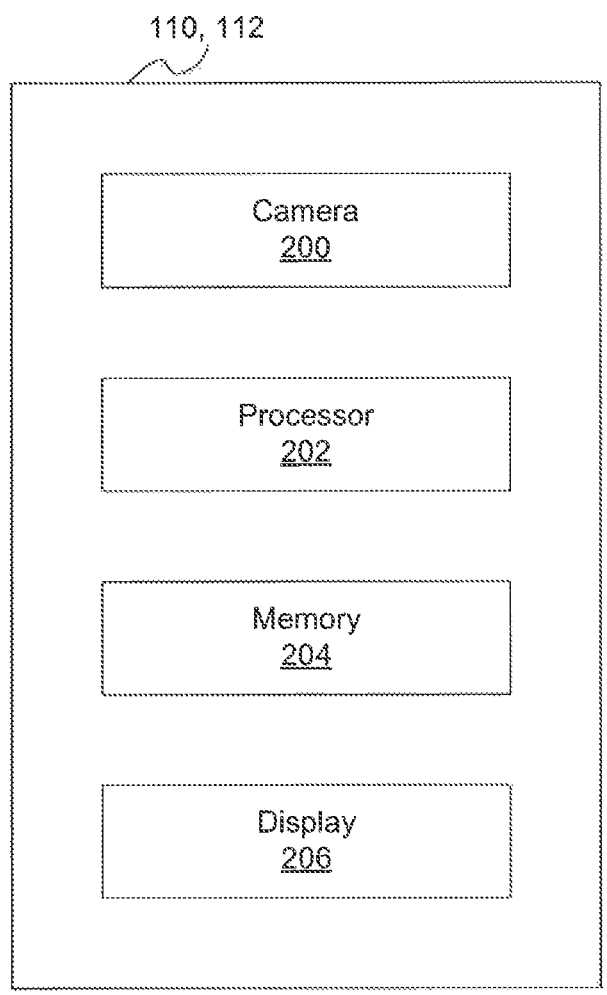
FIG. 2 is an example of components of the mobile devices shown in FIG. 1.

FIG. 2 is a diagram of the components of sender mobile device 110 and recipient mobile device 112, consistent with a disclosed embodiment. As shown in FIG. 2, sender mobile device 110 and recipient mobile device 112 may each comprise a camera 200, a processor 202, a memory 204, and a display 206.

Camera 200 may include any known camera hardware and/or software that can be implemented with a mobile device. Camera 200 may include an image sensor (not shown) for converting an optical image into an electrical signal. In some embodiments, more than one camera may be included in a mobile device (e.g., front and rear facing cameras on a smartphone). Elements and operations of camera 200 may be software-based and/or hardware-based.

Processor 202 may be one or more known processing devices, such as a microprocessor from the Pentium™ family manufactured by Intel™ or the Turion™ family manufactured by AMD™, or any of various processors manufactured by Sun Microsystems™. Processor 202 may include a single core or multiple core processor system that provides the ability to perform parallel processes simultaneously. For example, processor 202 may be a single core processor that is configured with virtual processing technologies known to those skilled in the art. In certain embodiments, processor 202 may use logical processors to simultaneously execute and control multiple processes. Processor 202 may implement virtual machine technologies, or other similar known technologies to provide the ability to execute, control, run, manipulate, store, etc., multiple software processes, applications, programs, etc. In another embodiment, processor 202 may include a multiple-core processor arrangement (e.g., dual or quad core) that is configured to provide parallel processing functionalities to allow mobile devices 110 and 112 to execute multiple processes simultaneously. One of ordinary skill in the art would understand that other types of processor arrangements could be implemented to provide the capabilities disclosed herein.

Memory 204 may be one or more memory devices that store data including, but not limited to, random access memory (RAM), read-only memory (ROM), a magnetic storage device (e.g., a hard disk), an optical storage medium (e.g., a CD- or DVD-ROM), a high-definition optical storage medium, an electronic storage device (e.g., EPROM or a flash drive), and/or another other data storage devices known in the art. Memory 204 may comprise a tangible and non-transitory computer-readable medium having stored therein computer programs, sets of instructions, code, or data to be executed by processor 202.

Memory 204 may also store an operating system, and may include browser applications capable of rendering standard Internet content, such as Microsoft Internet Explorer™, Google Chrome™, Apple Safari™, and/or Mozilla Firefox™. Memory 204 may also include one or more applications, such as word processing programs, spreadsheet programs, graphics programs, and/or other programs capable of generating documents or other electronic content. Application programs may be implemented using applets, plug-ins, modules, widgets, and/or any other software components. Additional details regarding applications stored in memory 204 are discussed below in connection with FIG. 3.

Display 206 may be any known display screen appropriate for a mobile device. For example, display 206 may comprise a high-definition (HD) liquid-crystal display (LCD). Furthermore, display 206 may comprise a touch sensitive display. For example, display 206 may include a capacitive touchscreen responsive to touch gestures, such as taps, swipes, and the like.

Although FIG. 2 depicts the same components shared between sender mobile device 110 and recipient mobile device 112, one of ordinary skill in the art will appreciate that these devices may include components from different manufacturers and/or have different performance specifications. For example, sender mobile device 110 and recipient mobile device 112 may include cameras having different image resolutions, processors having different processing speeds, and/or displays having different display resolutions.

Figure 3:
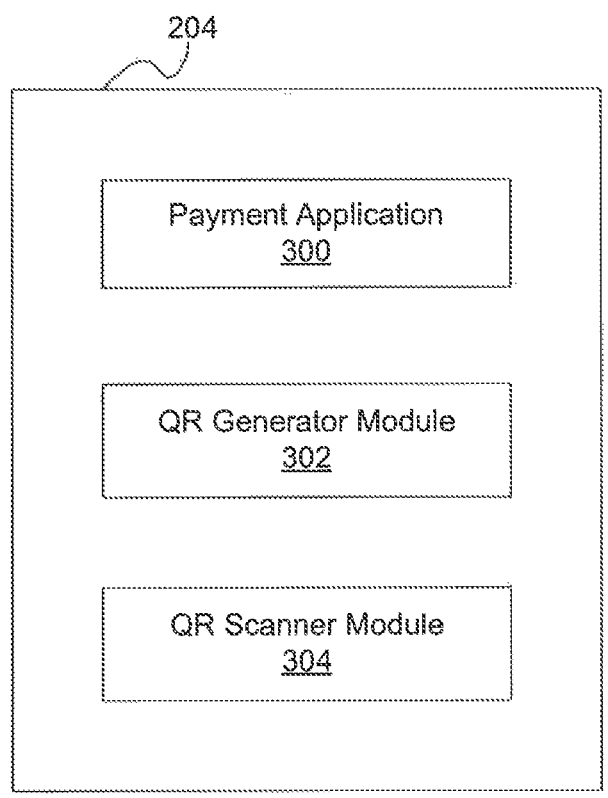
FIG. 3 is an example of program modules stored in the memory of the mobile devices shown in FIG. 1.

FIG. 3 is a diagram of software program modules that may be stored in memory 202, consistent with a disclosed embodiment. As shown in FIG. 3, memory 202 may store a payment application 300, a QR generator module 302, and a QR scanner module 304. One of skill in the art will appreciate that payment application 300 may cause QR generator module 302 and/or QR scanner module 304 to execute. In other embodiments, functionality associated with QR generator module 302 and/or QR scanner module 304 may be incorporated as part of payment application 300. Furthermore, functionality provided by QR generator module 302 and/or QR scanner module 304 may be combined into one module or incorporated within a single mobile application independent of payment application 300. In alternative embodiments, one or both of QR generator module 302 and QR scanner module 304 may be incorporated within a mobile application or software program module associated with camera 200.

Payment application 300 may provide functionality for a peer-to-peer ("P2P") payment transaction. In one embodiment, payment application 300 may be a stand-alone application. Users of sender mobile device 110 and recipient mobile device 112 may download payment application 300 from one or more software distribution platforms (e.g., the Apple iTunes App Store™, the Google Android Play Marketplace™ store, etc.). In another embodiment, payment application 300 may be integrated into another application, such as a financial application providing access to financial services and accounts (e.g., checking, savings, and credit accounts), or a personal finance application, such as Mint®, Quicken®, etc.

Payment application 300 may communicate over network 120 to receive data from and/or transmit data to one or more of sender financial account server 130, recipient financial account server 140, and payment management server 150. Communication between payment application 300 and other components of system 100 over network 120 may use a secure communication environment, such as an HTTPS (hypertext transfer protocol secure) environment to transfer data over network 120. Accordingly, data transfer is assumed to be secure.

QR generator module 302 may provide functionality for generating a QR code. For example, QR generator module 302 may be configured to enable the creation of a value-added QR code used for a payment transaction. A value-added QR code is a QR code in which a given monetary amount (e.g., dollar amount) has been assigned by, for example, a sender using payment application 300 on sender mobile device 110. A value-added QR code may be referred to as "electronic currency," which may be passed from sender mobile device 110 to recipient mobile device 112. The value-added QR code may also be stored on recipient mobile device 112 for reference and/or redemption at a later time.

To facilitate the exchange of the value-added QR code from sender mobile device 110 to recipient mobile device 112, QR generator module 302 may include instructions for displaying an image of a QR code on display 206 of sender mobile device 110 such that that a recipient using recipient mobile device 112 can scan the QR code. The recipient may scan the QR code by manipulating camera 200 of recipient mobile device 112, using hardware and/or software elements, such that the QR code displayed on sender mobile device 110 is within the field-of-view of camera 200 of recipient mobile device 112.

QR scanner module 304 may provide functionality for a QR code to be scanned by sender mobile device 110 and recipient mobile device 112. For example, QR scanner module 304 may include instructions executable by processor 202 for receiving electrical signals representing image data (e.g., image data representing a QR code) from camera 200. In one embodiment, QR scanner module 304 of recipient mobile device 112 may read the value-added QR code from sender mobile device 110 and store data representing the QR code in memory 204 of recipient mobile device 112.

Figure 4:
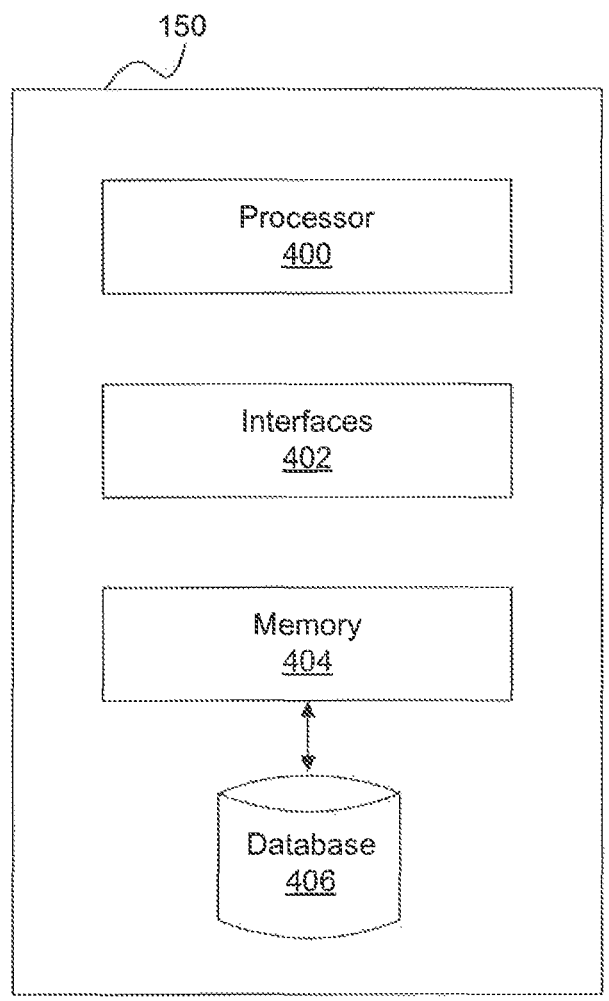
FIG. 4 is an example of the payment management system shown in FIG. 1.

FIG. 4 is a diagram of payment management server 150, consistent with a disclosed embodiment. As shown in FIG. 4, payment management server 150 may comprise a processor 400, interfaces 402, a memory 404, and a database 406. Payment management server 150 may be implemented in a distributed network. For example, payment management server 150 may communicate via network 120 with additional servers, which may enable payment management server 150 to distribute processes for parallel execution by a plurality of servers.

Processor 400 may be of similar construction as processor 202, discussed above. Further, although one processor is shown in FIG. 4, payment management server 150 may include a plurality of processors to facilitate parallel processing of computing tasks.

Interfaces 402 may provide communication with other components of system 100, including network 120. For example, interfaces 402 may comprise a communication device for sending and receiving data across network 120, including, but not limited to, a modem, a transceiver, a network communication card (e.g., an Ethernet card), a satellite dish, an antenna, or another network adapter capable of transmitting and receiving data over network 120. The interfaces may further comprise one or more interfaces to one or more input devices, such as one or more keyboards, mouse devices, and the like, that enable payment management server 150 to receive data from one or more external systems, such as other component computing systems of system 100.

Memory 404 may be of similar construction as memory 204, discussed above. Further, memory 204 may store program modules (not shown) for facilitating a peer-to-peer payment transaction. For example, memory 204 may store program modules related to processing a peer-to-peer payment transaction from a financial account associated with a user of sender mobile device 110 to a financial account associated with a user of recipient mobile device 112. As part of transaction process, memory 204 may include instructions for acting as a third-party intermediary. For example, memory 204 may include instructions for facilitating the exchange of a payment between a financial account associated with a user of sender mobile device 110 and a financial account associated with a user of recipient mobile device 112. As discussed above, the sender and recipient of a payment may have financial accounts at the same financial institution or different financial institutions. Alternatively, in an embodiment in which payment management server 150 maintains accounts for one or more parties to a translation, memory 404 may include instructions for completing the transfer of a payment to and/or from an account maintained by payment management server 150.

As shown in FIG. 4, memory 404 may access a database 406. Database 406 may be stored within a storage medium or storage device of payment management server 150. In some embodiments, database 406 may be stored in or be co-extensive with memory 404. Database 406 may comprise one or more document management systems, Microsoft® SQL databases, SharePoint databases, Oracle™ databases, Sybase™ databases, or other relational databases. Database 406 may store data related to users of sender mobile device 110 and/or recipient mobile device 112. For example, database 406 may include user profiles, user credentials (e.g., username and password), and other data identifying users of payment application 300 or other mobile applications associated with financial information. In embodiments in which payment management server 150 maintains accounts for one or more parties to a transaction, database 406 may further include financial account information (e.g., data indicating transactions and funds associated with a financial account).

Figure 5:
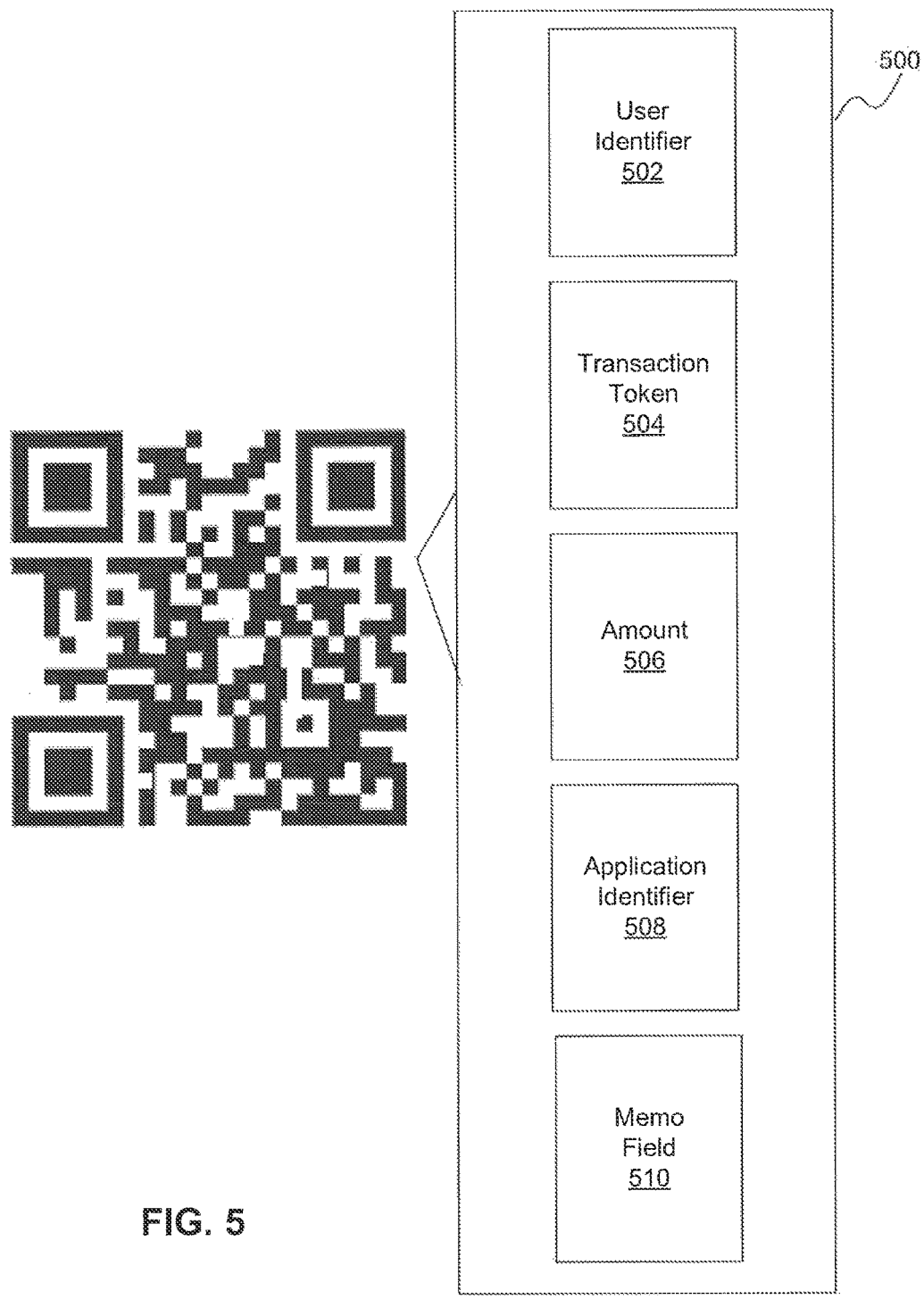
FIG. 5 is an example of data included within a QR code for use in a peer-to-peer payment transaction.

FIG. 5 is a diagram showing data that may be included in a QR code 500 for use in a peer-to-peer payment transaction, consistent with a disclosed embodiment. A QR code, such as QR code 500, may be generally described as a vector of data in the form of bits arranged in a way that can be generated for two-dimensional display. That is, the bits may be converted into a two-dimensional code, which can be displayed on a device (e.g., using display 206 of sender mobile device 110 and/or recipient mobile device 112). Further, the code may be transmitted to other component systems of system 100 using, for example, camera 200 included in recipient mobile device 112. A displayed QR code such as QR code 500 is akin to a barcode in that the QR code may be represented by a two-dimensional scannable matrix. For example, after scanning the QR code with a camera (e.g., camera 200) recipient mobile device 112 may convert the QR code back to its original vector of bits.

As shown in FIG. 5, QR code 500 may comprise various data and information, such as a user identifier 502, a transaction token 504, an amount 506, an application identifier 508, and a memo field 510. In some embodiments, one or more of the elements may be omitted from QR code 500. In other embodiments, more than one version or copy of each element may be incorporated into QR code 500.

User identifier 502 may identify sender mobile device 110 and/or a user operating sender mobile device 110. For example, user identifier 502 may constitute an alphanumeric identifier associated with sender mobile device 110 and/or a user operating sender mobile device 110. In some embodiments, user identifier 502 may be further configured to additionally identify recipient mobile device 112 and/or a user operating recipient mobile device 112. In some embodiments, user identifier 502 may comprise additional identifying information, such as information associated with sender financial account server 130, recipient financial account server 140, payment management server 150, and the entity or entities affiliated with those servers. Further, user identifier 502 may include information associated with individual financial service accounts, including but not limited to the sender's financial account from which funds are to be drawn for the P2P transaction as well as the recipient's financial account, to which the funds are to be transferred.

In some embodiments, QR code 500 may comprise a transaction token 504. Transaction token 504 may be a unique and anonymous transaction token issued by payment management server 150. In one embodiment, transaction token 504 may be provided by a financial institution (e.g., sender financial account server 130, recipient financial account server 140), or it may be generated by payment application 300. As described in more detail below in FIG. 14, transaction token 504 may be configured to provide extra security and enhanced tracking capabilities for a financial transaction involving QR code 500. Transaction token 504 may include identifying information, similar to that associated with user identifier 502, and may additionally include security and identity features that are independently verifiable by other members of system 100, as will be described in further detail below.

QR code 500 may further comprise information relating to a transaction amount 506. In some embodiments, the user associated with sender financial account server 130 may input amount 506 via payment application 300. As will be discussed below, depending on the configuration of payment application 300 and sender financial account server 130, amount 506 as incorporated within QR code 500 may be treated essentially as cash by payment management server 150 (i.e., payable to any user associated with a recipient mobile device 112), or it may be treated as an amount payable to a specific user associated with a recipient mobile device 112, in the manner of a check or other direct payment transaction. In some embodiments, payment application 300 and/or QR generator module 302 may be operable to change amount 506 after the user initially sets the amount. Amount 506 may be expressed in any tangible or virtual currency, including Bitcoin.

Application identifier 508 may identify the payment application 300 installed on sender mobile device 110. For example, application identifier 508 may be included in QR code 500 such that when an attempt is made to redeem QR code 500, the redeemer (e.g., a user of recipient mobile device 120), may ensure that QR code 500 was generated by and/or received from a known and trusted application. Accordingly, application identifier 508 may include data identifying one or more known and trusted applications for P2P payment transactions, including information relating to the developer of the application, the version, the operating system associated with the application, security information relating to the application, such as antivirus status, update status, etc. This list of information is intended to be exemplary, and other application information may be included within any given QR code 500. In some embodiments, application identifier 508 may contain information relating to other applications or systems, including but not limited to QR generator module 302, QR scanner module 304, or any other software module associated with sender mobile device 110, recipient mobile device 112, financial account servers 130 and 140, and payment management server 150.

QR code 500 may further comprise a memo field 510 to provide for the entry of a note or memo associated with a particular transaction. Memo field 510 may, for example, comprise information that would be associated with the memo field on a check. For example, a sender may send QR code 500 as a payment with, for example, the following memo: "Payment for sports tickets." In other embodiments, memo field 510 may comprise information including, but not limited to, the identity of the sender or the recipient, the identity of a particular financial account hosted on one or more of sender financial account server 130 or recipient financial account server 140, a date, purpose, or any other information that may be associated with a financial transaction. In some embodiments, payment application 300 and/or QR generator module 302 may be operable to amend memo field 510 after the user initially generates information within it.

Figure 6:
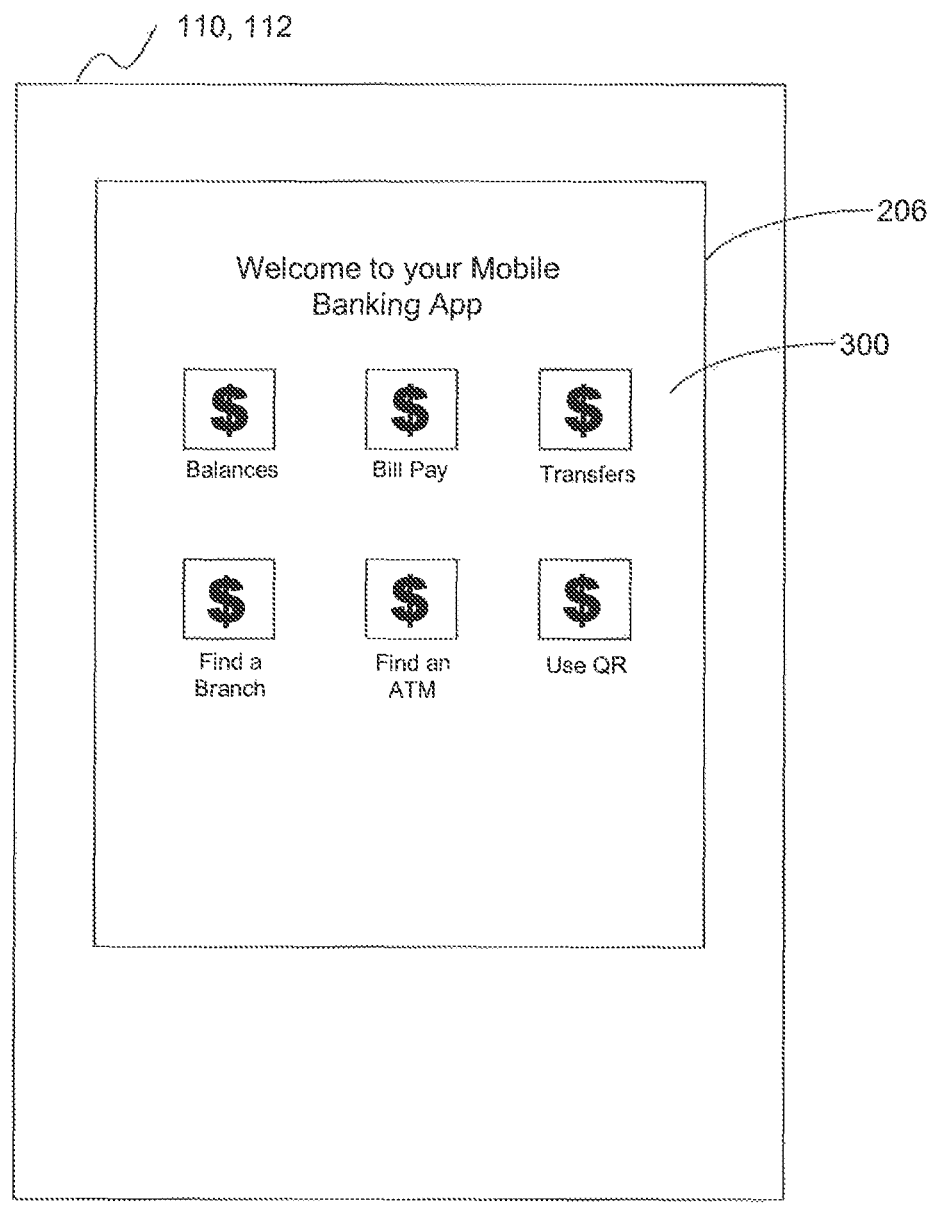
FIG. 6 is an example user interface for a mobile application associated with a financial service account provider.

FIG. 6 shows an example user interface that may be provided by the disclosed embodiments to perform financial transactions using QR codes. FIG. 6 illustrates a user interface displayed on display 206 of sender mobile device 110 and/or recipient mobile device 112. Aspects of the disclosed embodiments include software processes that, when executed by processor 202, generate and provide the content included in the user interface provided to mobile devices 110 and 112. FIG. 6 is presented in association with a user interface that may be programmed within payment application 300, but it is understood that the user interface is exemplary only and may be associated with or incorporated within any mobile application or software module. In addition to presenting textual information to mobile devices 110 and/or 112, the user interface may contain additional visual representations such as icons, as illustrated in the example of FIG. 6.

Figure 7:
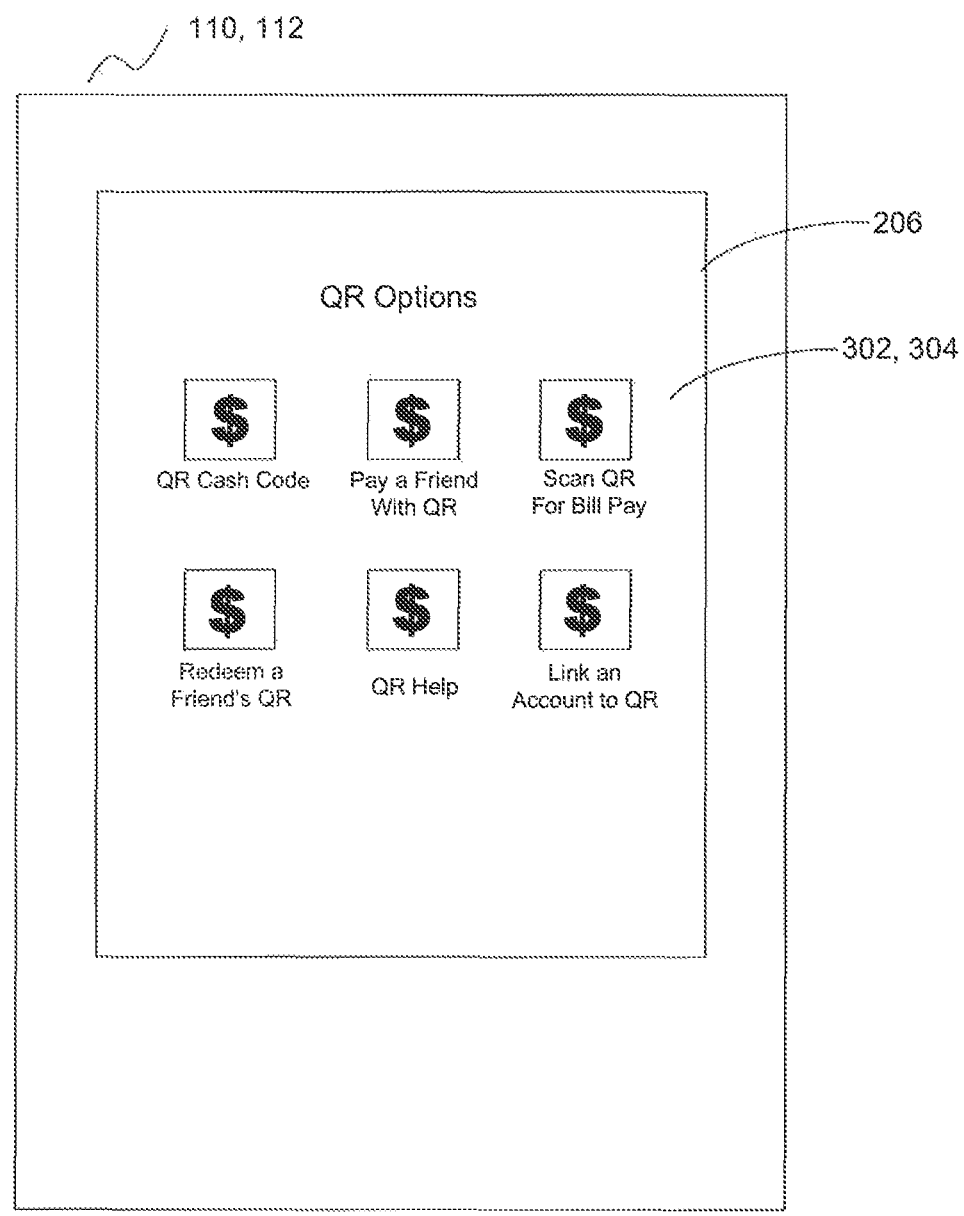
FIG. 7 is an example user interface for a mobile application associated with a financial service account provider.

FIG. 6 contains icons representing data and functions that may be associated with payment application 300, such as "Balances," "Bill Pay," "Transfers," "Find a Branch," "Find an ATM," and "Use QR." For example, selecting "Balances" may allow a user to view account balances, selecting "Bill Pay" may allow a user to initiate an electronic bill payment, and selecting "Transfers" may allow a user to initiate a funds transfer. Selecting "Find a Branch" and "Find an ATM" may allow a user to access a directory to search for bank branches and ATMs, respectively. Selecting "Use QR" may provide options associated with payment application 300 and may navigate a user to a menu of options as shown in FIG. 7, discussed below. It is understood that these icons, data, and functions shown in FIG. 6 are examples, and a particular user interface or mobile application may contain more or fewer icons, data, and/or functions. Aspects of the disclosed embodiments include software processes that, when executed by processor 202, generate further potential functionalities relating to banking or payment. Other formats, types of content, queries, mechanisms for uploading, etc., can be implemented to allow mobile devices 110 and/or 112 to perform processes and functions associated with the disclosed embodiments.

FIG. 7 shows an example of a user interface that may be provided by the disclosed embodiments to perform financial transactions using QR codes. FIG. 7 illustrates a user interface displayed on display 206 of sender mobile device 110 and/or recipient mobile device 112. Aspects of the disclosed embodiments include software processes that, when executed by processor 202, generate and provide the content included in the user interface provided to mobile devices 110 and 112. FIG. 7 is presented in association with a user interface that may be programmed within QR generator module 302 and/or QR scanner module 304, but it is understood that the user interface is exemplary only and may be associated with or incorporated within any mobile application or software module. For example, the user interface of FIG. 7 may be accessed by selection or input of an icon within the user interface described above in association with FIG. 6 and payment application 300, such as "Use QR." In addition to presenting textual information to mobile devices 110 and/or 112, the user interface may contain additional visual representations such as icons, as illustrated in the example of FIG. 7.

Figure 8:
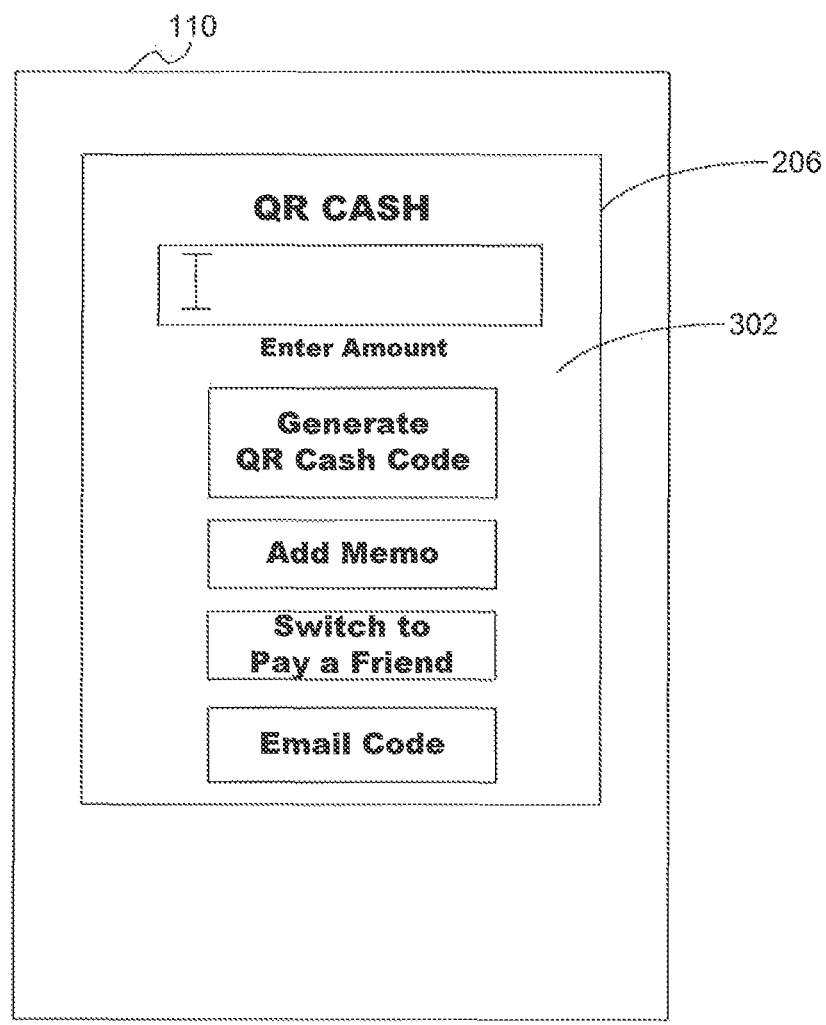
FIG. 8 is an example user interface for a mobile application associated with a financial service account provider.
Figure 9:
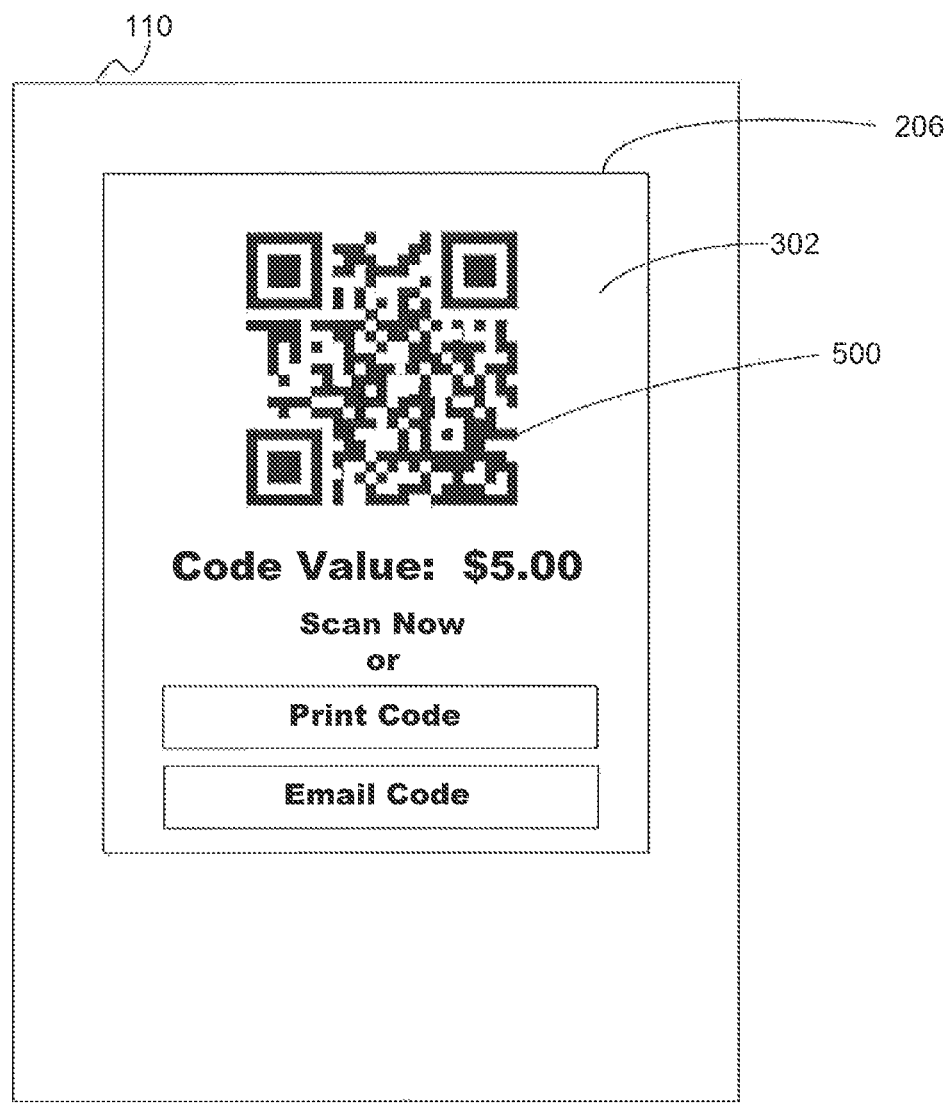
FIG. 9 is an example user interface for a mobile application associated with a financial service account provider.

FIG. 7 contains icons representing data and functions that may be associated with payment application 300, QR generator module 302 and/or QR scanner module 304 such as "QR Cash Code," "Pay a Friend with QR," "Scan QR for Bill Pay," "Redeem a Friend's QR," "QR Help," and "Link an Account to QR." For example, selecting "QR Cash Code" may allow a user to generate a P2P payment QR code that may be scanned by any recipient, and may navigate a user to a series of user interfaces such as those shown in FIGS. 8-10, discussed below. Selecting "Pay a Friend with QR" may allow a user to generate a P2P payment QR code that may be transferred only to a particular recipient, and selecting "Scan QR for Bill Pay" may allow a user either to scan a QR code on a bill to capture bill payment information or to generate a QR code to pay bills. Selecting "Redeem a Friend's QR" may allow a user to scan a QR code presented by another user for purposes of receiving payment. Selecting "QR Help" may provide a searchable index of help topics pertaining to generating or scanning QR codes for financial transactions. Alternatively, in some embodiments "QR Help" may activate options permitting the user to directly contact a representative of an entity associated with payment application 300, for example, by telephone, email, live chat, etc. Selecting "Link an Account to QR" may allow a user to enable present or future payments to be drawn from and/or deposited into a particular financial service account associated with the user and with payment application 300. It is understood that these icons, data, and functions are examples, and a particular user interface or mobile application may contain more or fewer icons, data, and/or functions. Aspects of the disclosed embodiments include software processes that, when executed by processors 202, generate further potential functionalities relating to banking or payment. Other formats, types of content, queries, mechanisms for uploading, etc., can be implemented to allow mobile devices 110 and/or 112 to perform processes and functions associated with the disclosed embodiments.

FIG. 8 shows an example of a user interface that may be provided by the disclosed embodiments to perform financial transactions using QR codes. FIG. 8 illustrates a user interface displayed on display 206 of sender mobile device 110. Aspects of the disclosed embodiments include software processes that, when executed by processor 202, generate and provide the content included in the user interface provided to mobile devices 110 and 112. FIG. 8 is presented in association with a user interface that may be programmed within QR generator module 302, but it is understood that the user interface is exemplary only and may be associated with or incorporated within any mobile application or software module. For example, the user interface of FIG. 8 may be accessed by selection or input of an icon within the user interfaces described above in association with FIGS. 6 and 7 and payment application 300, such as "Use QR" or "QR Cash Code." In addition to presenting textual information to mobile devices 110 and/or 112, the user interface may contain additional visual representations such as icons or buttons, as illustrated in the example of FIG. 8.

FIG. 8 contains buttons and fields representing data and functions that may be associated with payment application 300, QR generator module 302, and/or QR scanner module 304 such as "Enter Amount," "Generate QR Cash Code," "Add Memo," "Switch to Pay a Friend," and "Email Code." It is understood that these buttons and fields are examples, and a particular user interface or mobile application may contain more or fewer icons, buttons, fields, data, and/or functions. Fields, such as the "Enter Amount" field shown in FIG. 8, may be configured to receive input from interface components of mobile devices 110 and 112 (not shown) such as a keyboard, touchball, touchscreen, or microphone. Regarding the buttons, in some embodiments, selecting "Generate QR Cash Code" may allow a user to generate a P2P payment QR code that may be scanned by any recipient in the amount of currency specified in the "Enter Amount" field, and may navigate a user to a series of additional user interfaces such as those shown in FIGS. 9-10, discussed below. Selecting "Add Memo" may allow a user to add an optional memo field containing information about the transaction to the QR code, such as memo field 510 discussed above. Selecting "Switch to Pay a Friend" may allow a user to generate a P2P payment QR code that may be scanned only by a particular recipient in a different mode of operation described in detail below, and selecting "Email Code" may allow sender mobile device 110 to email a copy of the QR code to the recipient for printing and/or scanning at a later time. Aspects of the disclosed embodiments include software processes that, when executed by processors 202, generate further potential functionalities relating to banking or payment. Other formats, types of content, queries, mechanisms for uploading, etc., can be implemented to allow mobile devices 110 and/or 112 to perform processes and functions associated with the disclosed embodiments.

The example user interface of FIG. 8 illustrates a "QR Cash" mode, in which a QR code containing payment information can be generated by QR generator module 302 that is redeemable by any user associated with a recipient mobile device 112. In alternative embodiments, payment application 300 and/or QR generator module 302 may configure and display a user interface (not shown) directed to an alternative "Pay a Friend" mode. This mode, which may, for example, be accessed via various buttons, icons, or fields as illustrated in FIGS. 6 and 7, permits a user associated with sender mobile device 110 to generate a QR code containing payment transaction information directed to a particular user associated with a recipient mobile device 112. In these embodiments, a generated user interface displayed on sender mobile device 110 may contain additional fields for input of information, such as the identity (name, phone number, email address, location, etc.) of the desired particular recipient, information related to a particular account associated with the particular recipient, duration of time when the QR code is valid, etc. These fields may be comparable to information that might be included on a personal check between two parties. This description is intended to be a non-limiting example, and a user interface operable to send money directly to a particular user may contain different elements than those described.

FIG. 9 shows an example of a user interface that may be provided by the disclosed embodiments to perform financial transactions using QR codes. FIG. 9 illustrates a user interface displayed on display 206 of sender mobile device 110. Aspects of the disclosed embodiments include software processes that, when executed by processor 202, generate and provide the content included in the user interface provided to mobile devices 110 and 112. FIG. 9 is presented in association with a user interface that may be programmed within QR generator module 302, but it is understood that the user interface is exemplary only and may be associated with or incorporated within any mobile application or software module. For example, the user interface of FIG. 9 may be accessed by selection or input of an icon within the user interfaces described above in association with FIGS. 6-8 and payment application 300, such as "Use QR" in FIG. 6 or "QR Cash Code" in FIG. 7, as described above. In addition to presenting textual information to mobile devices 110 and/or 112, the user interface may contain additional visual representations such as icons or buttons, as illustrated in the example of FIG. 9.

FIG. 9 contains buttons and fields representing data and functions that may be associated with payment application 300, QR generator module 302, and/or QR scanner module 304 such as "Print Code" and "Email Code." For example, selecting "Print Code" may allow a user to print a paper copy of the generated QR code for easier scanning or scanning at a later time. Selecting "Email Code" may, as described above, allow sender mobile device 110 to email a copy of the QR code to the recipient for printing and/or scanning at a later time. It is understood that these buttons and fields are examples, and a particular user interface or mobile application may contain more or fewer icons, buttons, fields, data, and/or functions. FIG. 9 also illustrates a generated visual representation of QR code 500, which is presented for scanning by recipient mobile device 112. Aspects of the disclosed embodiments include software processes that, when executed by processors 202, generate further potential functionalities relating to banking or payment. Other formats, types of content, queries, mechanisms for uploading, etc., can be implemented to allow mobile devices 110 and/or 112 to perform processes and functions associated with the disclosed embodiments.

Figure 10B:
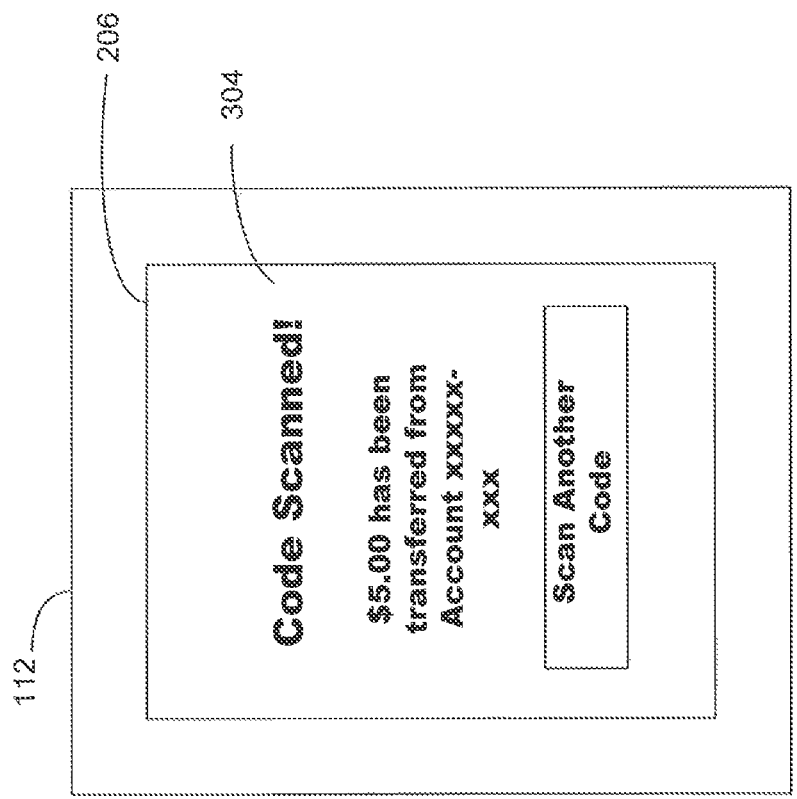
FIG. 10B illustrates an example of a user interface for a mobile application configured for a mobile device associated with a recipient of funds in a P2P transaction.
Figure 10A:
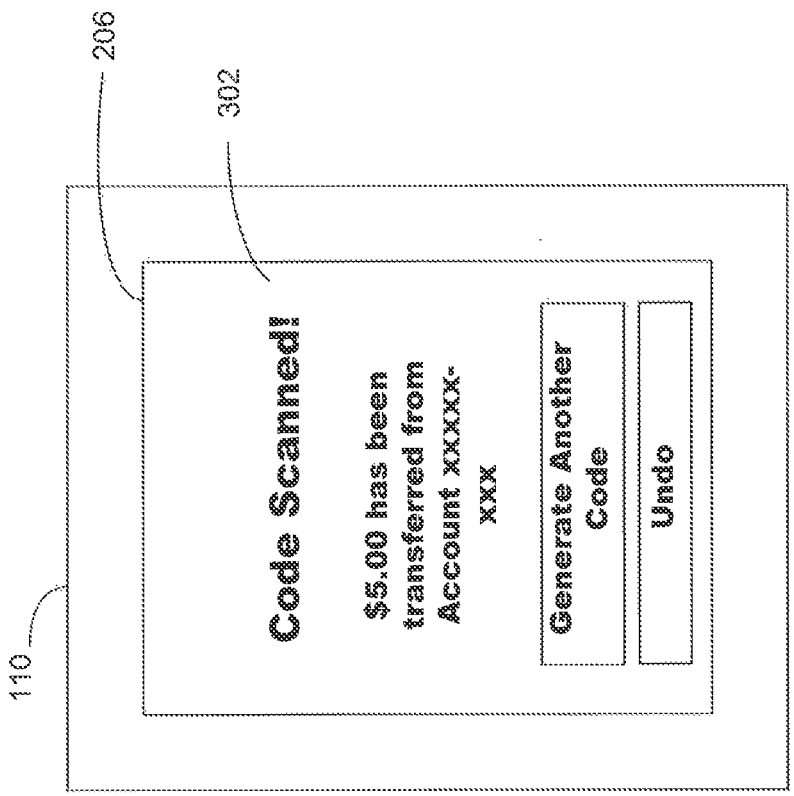
FIG. 10A illustrates an example of a user interface for a mobile application configured for a mobile device associated with a sender of funds in a P2P transaction.

FIGS. 10A and 10B show examples of user interfaces that may be provided by the disclosed embodiments to perform financial transactions using QR codes. FIG. 10A illustrates a user interface displayed on display 206 of sender mobile device 110. Aspects of the disclosed embodiments include software processes that, when executed by processor 202, generate and provide the content included in the user interface provided to mobile device 110. FIG. 10A is presented in association with a user interface that may be programmed within QR generator module 302, but it is understood that the user interface is exemplary only and may be associated with or incorporated within any mobile application or software module. For example, the user interface of FIG. 10A may be accessed by selection or input of an icon within the user interfaces described above in association with FIGS. 6-9 and payment application 300, such as "Use QR" in FIG. 6, or "QR Cash Code" in FIG. 7. In addition to presenting textual information to mobile device 110, the user interface may contain additional visual representations such as icons or buttons, as illustrated in the example of FIG. 10A.

FIG. 10A contains buttons and fields representing data and functions that may be associated with payment application 300, QR generator module 302 and/or QR scanner module 304 such as "Generate Another Code" and "Undo." It is understood that these buttons and fields are exemplary, and a particular user interface or mobile application may contain more or fewer icons, buttons, fields, data, and/or functions. The user interface of FIG. 10A illustrates an example confirmation screen that may be displayed after a recipient mobile device 112 scans a QR code 500 displayed on sender mobile device 110. After scanning of QR code 500, the user interface of FIG. 10A may permit sender mobile device 110 to repeat and refresh the processes and user interfaces of the disclosed embodiments to generate another QR code for a payment transaction. In other embodiments, the user interface of FIG. 10A may permit sender mobile device 110 to "undo," or cancel, a payment transaction completed using a QR code such as QR code 500. In these embodiments, selection of the "Undo" button may additionally permit amendment of some aspect of the transaction, such as the amount 506, user identifier 502, application identifier 508, or memo field 510 without cancelling the entirety of the payment transaction. Aspects of the disclosed embodiments include software processes that, when executed by processor 202, generate further potential functionalities relating to banking or payment. Other formats, types of content, queries, mechanisms for uploading, etc., can be implemented to allow mobile device 110 to perform processes and functions associated with the disclosed embodiments.

FIG. 10B illustrates a user interface displayed on display 206 of recipient mobile device 112. Aspects of the disclosed embodiments include software processes that, when executed by processor 202, generate and provide the content included in the user interface provided to mobile device 112. FIG. 10B is presented in association with a user interface that may be programmed within QR scanner module 304, but it is understood that the user interface is exemplary only and may be associated with or incorporated within any mobile application or software module. For example, the user interface of FIG. 10B may be accessed by selection or input of an icon within the user interfaces described above in association with FIGS. 6-9 and payment application 300, such as "Use QR" in FIG. 6, or "Redeem a Friend's QR" in FIG. 7. In addition to presenting textual information to mobile device 112, the user interface may contain additional visual representations such as icons or buttons, as illustrated in the example of FIG. 10B.

FIG. 10B contains buttons and fields representing data and functions that may be associated with payment application 300, QR generator module 302 and/or QR scanner module 304 such as "Scan Another Code." It is understood that these buttons and fields are exemplary, and a particular user interface or mobile application may contain more or fewer icons, buttons, fields, data, and/or functions. The user interface of FIG. 10B illustrates an example confirmation screen that may be displayed after a recipient mobile device 112 scans a QR code 500 displayed on sender mobile device 110. After scanning of QR code 500, the user interface of FIG. 10B may permit recipient mobile device 112 to repeat and refresh the processes and user interfaces of the disclosed embodiments to scan another QR code for a payment transaction. Aspects of the disclosed embodiments include software processes that, when executed by processor 202, generate further potential functionalities relating to banking or payment. Other formats, types of content, queries, mechanisms for uploading, etc., can be implemented to allow mobile device 112 to perform processes and functions associated with the disclosed embodiments.

Figure 11:
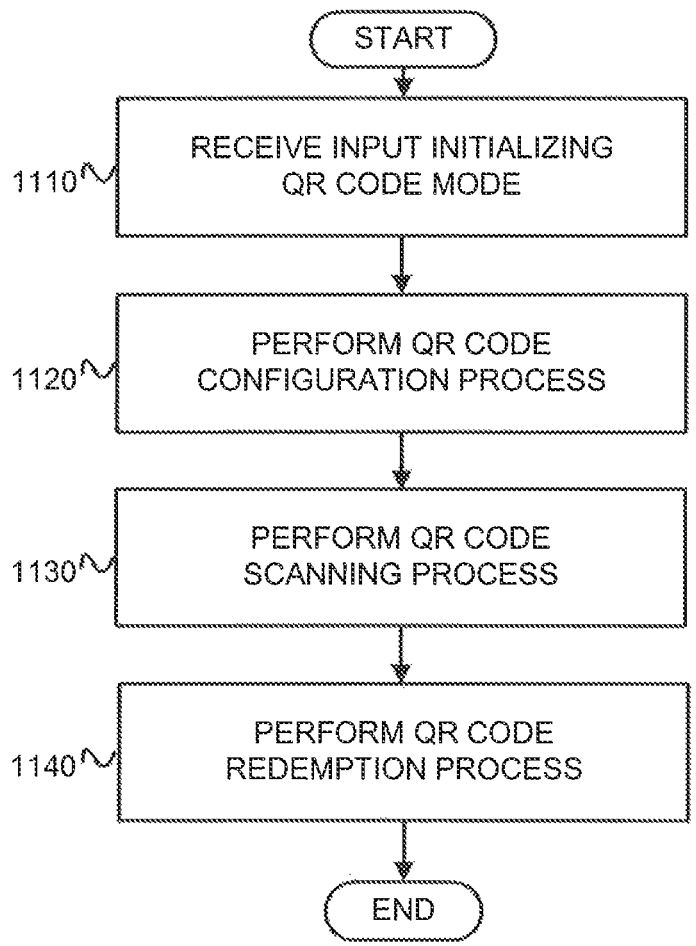
FIG. 11 is an example of a process for performing a financial transaction using a QR code.

FIG. 11 illustrates a method 1100 for a peer-to-peer payment transaction, consistent with a disclosed embodiment. Specifically, FIG. 11 shows a process or method of using a QR code 500 to initiate and transfer funds from the sender to the recipient.

Sender mobile device 110 may receive a user input initializing a QR code mode or functionality (Step 1110). In some embodiments, the user of sender mobile device 110 may provide the input by selecting or otherwise engaging a link, button, icon, or other graphical element incorporated within a graphical user interface displayed on display 206, such as those described above in association with FIGS. 6-7. For example, the received input may comprise a press input on the "Use QR" icon illustrated in the example user interface illustrated in FIG. 6. Those of ordinary skill of the art may readily contemplate other means for initiating a QR mode, either within payment application 300 or through other means. For example, in one embodiment a user may activate the QR mode by saying "QR mode" into a microphone (not shown) associated with sender mobile device 110.

Sender mobile device 110 may perform a QR code configuration process, such as is described below in connection with FIG. 12 (Step 1120). Mobile device 110 may perform elements of process 1120 in communication with or in conjunction with other elements of system 100, including but not limited to sender financial account server 130 and/or payment management server 150. In brief, according to some embodiments, sender mobile device 110 (via payment application 300 and/or QR generator module 302) may verify the sender's identity, and determine a financial service account associated with the sender to use in a payment transaction. Sender mobile device 110 may receive input of a desired amount (such as amount 506) to be incorporated into a QR code for payment (such as QR code 500). Sender mobile device 110 may determine if the designated financial account contains sufficient funds to generate the QR code. If there are not sufficient funds, payment application 300 and/or QR generator module 302 may initially decline to configure QR code 500, and may determine a financial account associated with the sender that does contain sufficient funds to generate the QR code. If an account containing sufficient funds is found, sender mobile device 110 may perform a process to add additional configuration options to the generated QR code, and then may generate the code. Sender mobile device 110 may display the generated QR code (such as QR code 500) on the display of device 110, such as display 206, and may transmit a notification of the successful code generation to an external server, such as payment management server 150.

Recipient mobile device 112 may next perform a QR code scanning process, such as is described below in connection with FIG. 15 (Step 1130). Recipient mobile device 112 may perform one or more steps of process 1130 in communication with or in conjunction with other elements of system 100 including, but not limited to, sender mobile device 110, sender financial account server 130, recipient financial account server 140, and/or payment management server 150. In brief, according to some embodiments, recipient mobile device 112 (via camera 200, payment application 300 and/or QR scanner module 304) may receive an input initializing QR mode, specifically a QR scanning mode. Recipient mobile device 112 may configure a camera (such as camera 200) and scan a QR code (such as QR code 500) displayed on an external device, such as display 206 of sender mobile device 110. Recipient mobile device 112 may determine if the scan was successful. If not, it may prompt the user to re-scan the QR code. If the scan was successful, payment application 300 and/or QR scanner module 304 may display a user interface screen confirming a successful scan, and may transmit a notification of the successful scan to an external system, such as sender financial account server 130, recipient financial account server 140, and/or payment management server 150.

Payment management server 150 may perform a QR code redemption process, such as is described below in connection with FIG. 16 (Step 1140). Payment management server 150 may perform elements of process 1140 in communication with or in conjunction with other elements of system 100, including but not limited to sender mobile device 110, recipient mobile device 112, sender financial account server 130, and/or recipient financial account server 140. In brief, according to some embodiments, payment management server 150 (via processor 400 and/or interfaces 402) may receive transmission of a scanned QR code, such as QR code 500. Payment management server 150 may analyze the scanned QR code, including determining if an optional transaction token is present. If the transaction token is present, payment management server 150 may read and validate the transaction token. Payment management server 150 may determine if the funds for transfer associated with the scanned QR code are authorized. If not authorized, payment management server 150 may decline the transfer of funds. If authorized, payment management server 150 may configure the sender and recipient financial accounts to facilitate the transfer, transmit the funds, and send confirmations of the transfer to various other components of system 100.

Figure 12:
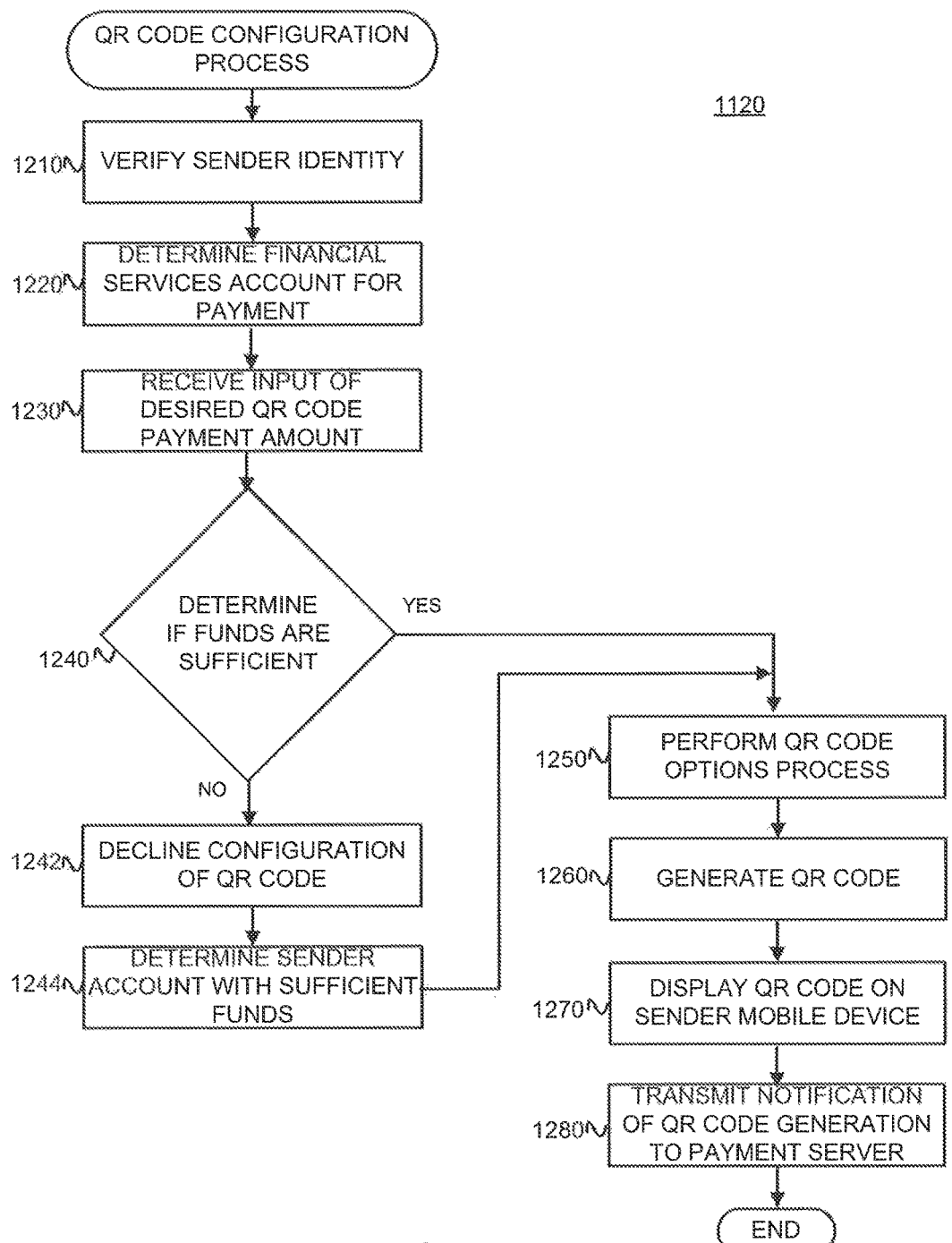
FIG. 12 is an example of a QR code configuration process.

FIG. 12 illustrates a QR code configuration process consistent with certain disclosed embodiments, such as the one discussed above in association with step 1120 of process 1100 described previously. Process 1120, as well as any or all of the individual steps therein, may be performed by any one or more of sender mobile device 110, sender financial account server 130, or payment management server 150. For exemplary purposes, FIG. 12 is described as being performed by sender mobile device 110.

Sender mobile device 110, via payment application 300 and/or QR generator module 302, may verify the identity of the sender (Step 1210). Sender mobile device 110 may verify sender identity in a number of ways, including but not limited to requiring entry of a password, requiring input of answers to one or more security questions, requiring submission of a biometric security item (such as a fingerprint or a retinal scan), etc. In some embodiments, these verification steps may have been previously performed in order to initiate one or both of payment application 300 or a "QR mode" therein, as described above. In these embodiments, sender mobile device 110 may not require re-verification of identity, though it may still do so for added security.

QR generator module 302 may determine a financial services account associated with the sender to provide funds for a payment (Step 1220). In some embodiments, QR generator module 302 may directly prompt the sender to specify the desired account. In other embodiments, the sender may have previously specified the account within payment application 300 before entering "QR mode." In some embodiments, sender mobile device 110 may determine the desired financial account from a query or other notification sent to one or both of sender financial account server 130 or payment management server 150.

Sender mobile device 110 may receive input from the sender of an amount for the QR code payment, such as amount 506 (Step 1230). In some embodiments, such as the embodiment illustrated in FIG. 9, sender mobile device 110 may receive an input typed into a field displayed on display 206 via a virtual or physical keyboard (not shown). In other embodiments, the amount 506 may be received through other input means, such as a verbal input spoken into a microphone associated with sender mobile device 110 (not shown). In still other embodiments, amount 506 may be specified by selection from a drop-down menu displayed within payment application 300.

QR generator module 302 may determine if the funds in the specified sender financial account are sufficient to cover the inputted amount 506 (Step 1240). In some embodiments, QR generator module 302 may determine if the funds are sufficient via an internal verification of information contained within memory 204 of sender mobile device 110. For example, account balances may be contained within memory 204. In other embodiments, payment application 300 may either contain the balance information to determine sufficiency of funds, or may be able to quickly verify the information with sender financial account server 130 over network 120. In other embodiments, QR generator module 302 may send a request to sender financial account server 130 to determine if there are sufficient funds to transmit amount 506 within a QR code. In some embodiments, sender financial account server 130 may send a notification to sender mobile device 110 in response to the request confirming that the specified sender financial account contains funds equal to or greater than amount 506.

If QR generator module 302 determines that the selected sender financial account does not contain sufficient funds to complete a QR code-based transfer of amount 506 (Step 1240: NO), QR generator module 302 may decline to configure the QR code (Step 1242). QR generator module 302 may display a notification to the sender via display 206 regarding the denial, and may further send notifications regarding the denial to one or more of sender financial account server 130 or payment management server 150.

After denial of the initial QR code configuration, in some embodiments QR generator module 302 may determine another financial account associated with the sender that does contain sufficient funds to cover amount 506 (Step 1244). In some embodiments the second financial account may be another account configured by the same financial account provider associated with sender financial account server 130. In alternative embodiments, the other financial account may be associated with a different financial service provider and a different financial account server 130 (as well as perhaps a different associated payment application 300). Further, in some embodiments QR generator module 302 may be configured to draw an amount of funds less than amount 506 from each of several different financial accounts. The several different financial accounts may all be provided by the same financial service provider, or may be provided by several different financial service providers.

After determining at least one sender financial account containing sufficient funds (Step 1240: YES; alternatively, a determination made in Step 1244), sender mobile device 110 may perform a QR code options process, such as is described below in connection with FIG. 13 (Step 1250). In brief, according to some embodiments, sender mobile device 110 (via payment application 300 or QR generator module 302) may determine if added security is desired for the QR code payment, and if so, may perform an additional transaction token configuration process, to be described below in connection with FIG. 14. Sender mobile device 110 may determine if the sender wishes to add a memo, such as memo field 510, to a configured QR code, such as QR code 500. If a memo is desired, sender mobile device 110 may receive input of the memo field 510 and configure display of the memo within QR code 500. Sender mobile device 110 may further determine if alternative delivery options are desired, such as printing or emailing of generated QR code 500, and if so, may configure those alternative delivery options.

QR generator module may generate a QR code, such as QR code 500, for purposes of completing a financial payment transaction in the amount of amount 506 (Step 1260). In some embodiments, QR generator module may add additional fees to amount 506 prior to generation of QR code 500 comprising service fees, taxes, and/or other such fees payable to any or all of sender financial account server 130, recipient financial account server 140, or payment management server 150. QR generator module 302 may configure the visual display appearance of QR code 500 to ensure correct information and to ensure a unique QR code. In some embodiments where additional options were added to the QR code during step 1250, QR generator module 302 may configure display of those additional options in generating QR code 500.

QR generator module 302 may display the generated QR code 500 on display 206 of sender mobile device 110 (Step 1270). Display of the code may occur substantially similarly to the manner illustrated in FIG. 9, described above. Display of QR code 500 may be accompanied with additional information configured and displayed by QR generator module 302, such as the amount 506 contained within the code, a memo field 510 associated with the code, sender or recipient identification information such as user identifier 502, etc. It is understood that QR code 500 may be displayed with any other information deemed necessary, based on configurations of sender mobile device 110, display 206, payment application 300, sender financial account server 130, or payment management server 150.

In some embodiments, QR generator module 302 may generate and transmit a notification that the QR code 500 was generated to one or more of sender financial account server 130 or payment management server 150 (Step 1280). The notification may comprise a textual notification that the code was generated. In other embodiments, the notification may contain a visual confirmation of code generation, such as a copy of the graphical user interface (such as that displayed in FIG. 9 and discussed above) presented on display 206 of sender mobile device 110.

Figure 13:
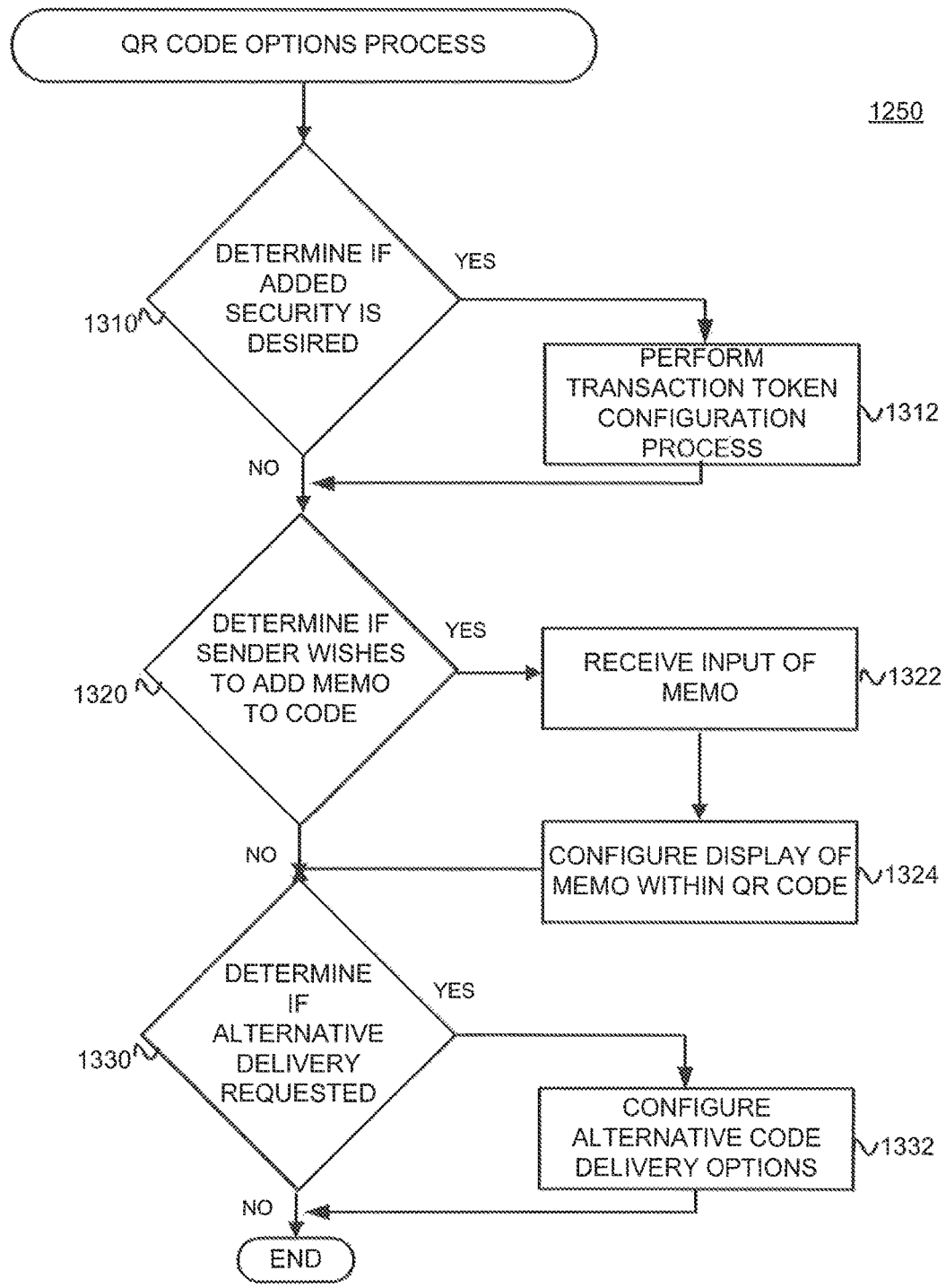
FIG. 13 is an example of a QR code options process.

FIG. 13 illustrates an example QR code options process, such as the one discussed above in association with Step 1250 of QR code configuration process 1200. Process 1250, as well as any or all of the individual steps therein, may be performed by any one or more of sender mobile device 110, sender financial account server 130, or payment management server 150. For exemplary purposes, FIG. 12 is described as being performed by sender mobile device 110.

Sender mobile device 110, via QR generator module 302, may determine if various additional optional features are to be added to QR code 500 prior to generating and displaying the code. In some embodiments, QR generator module 302 may determine if additional security is desired and/or required for the QR code (Step 1310). In some embodiments, security may be requested based on provisions and agreements associated with the sender's financial account provider and associated server 130. In some embodiments, security may be requested based upon the amount 506 of the transaction, or based upon information contained within optional memo field 510. In still other embodiments, additional security may be requested based on the sender's geographical location as detected by sender mobile device 110. In yet other embodiments, additional security may be requested based on information associated with user identifier 502, for example, based on creditworthiness of the sender as determined by one or more of sender financial account server 130, recipient financial account server 140, or payment management server 150.

If sender mobile device 110 determines that added security is to be integrated into QR code 500 (Step 1310: YES), then sender mobile device 110 may perform a transaction token configuration process, such as is described below in connection with FIG. 14 (Step 1312). In brief, according to some embodiments, sender mobile device 110 (via payment application 300 or QR generator module 302) may determine sender identification information, and may configure a software object, or transaction token, incorporating the information. Sender mobile device 110 may further configure access to the transaction token, and configure its display within QR code 500.

In embodiments where additional security is not requested or desired (Step 1310: NO), or after such security has been added in Step 1312, QR generator module 302 may determine if a memo is to be added to QR code 500, such as memo field 510 (Step 1320). In some embodiments, QR generator module 302 may prompt the sender through payment application 300 whether they want to enter a memo, such as via the "Add Memo" button illustrated and described previously in FIG. 8. In embodiments where a memo is desired (Step 1320: YES), sender mobile device 110 may receive input of information to be contained within memo field 510 of QR code 500 (Step 1322). In these embodiments, the memo field information may be received through a variety of input means, such as through a virtual or physical keyboard associated with sender mobile device 110, or verbally via a microphone (not shown) associated with sender mobile device 110. Upon receiving the input of the memo field 510 information, QR generator module 302 may configure display of the information within QR code 500 (Step 1324). In some embodiments, the memo field 510 information may be configured and displayed so as to be directly readable within QR code 500. In other embodiments, the information may be embedded within QR code 500 as a link to an external location, for example, a website on an external server accessible via network 120. If necessary, in some embodiments if a QR code 500 has already been generated, QR generator module 302 may re-generate the code in order to incorporate the memo field 510 information.

In embodiments where a memo is not requested or desired (Step 1320: NO), or after such a memo has been configured in Step 1324, QR generator module 302 may determine if alternative delivery options are to be added to QR code 500 (Step 1330). In some embodiments, QR generator module 302 may prompt the sender through payment application 300 whether they want to add alternative delivery options, such as via the "Print Code" and/or "Email Code" buttons illustrated and described previously in FIGS. 8-9. In embodiments where such alternative delivery methods are desired (Step 1330: YES), QR generator module 302 may configure delivery of such options (Step 1332). In these embodiments, the delivery options may require identification or input of additional information, such as the network location of a desired printer, or an email address associated with one or more of recipient mobile device 112 and/or recipient financial account server 140. In some embodiments, the alternative delivery options may be configured and displayed so as to be directly readable within QR code 500. In other embodiments, the information may be embedded within QR code 500 as a link to an external location, for example, a website on an external server accessible via network 120. If necessary, in some embodiments if a QR code 500 has already been generated, QR generator module 302 may re-generate the code in order to incorporate the alternative delivery information.

Figure 14:
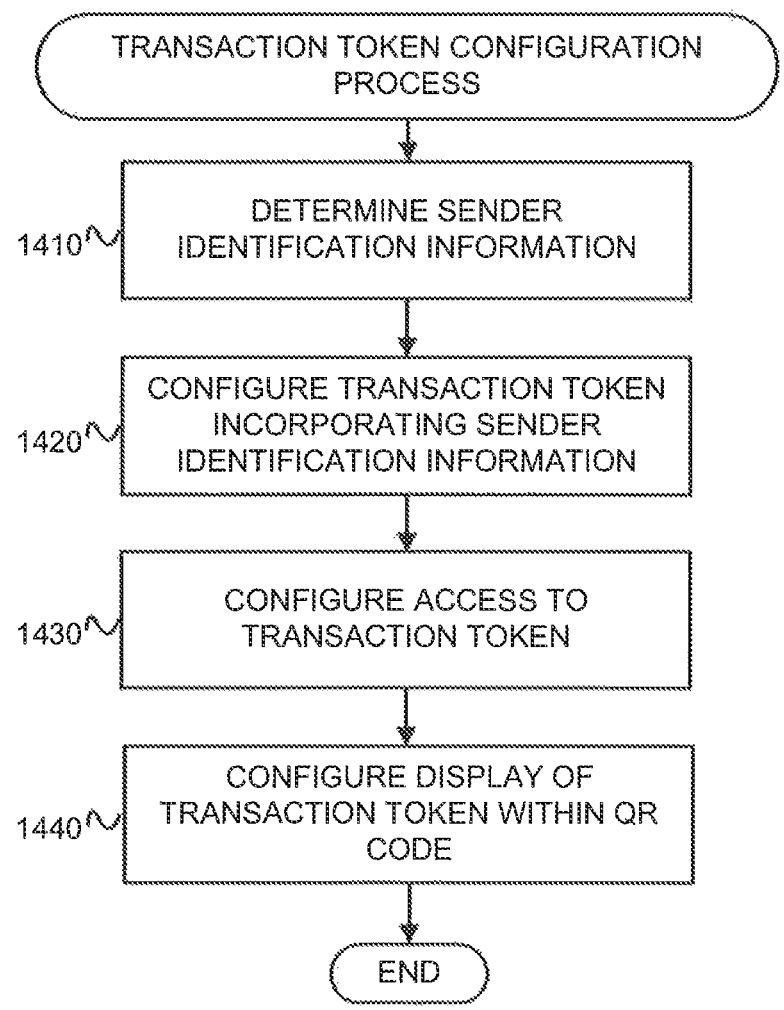
FIG. 14 is an example of a transaction token configuration process.

FIG. 14 illustrates a transaction token configuration process (corresponding to Step 1315 of process 1250 disclosed above) consistent with certain disclosed embodiments. Process 1315, as well as any or all of the individual steps therein, may be performed by any one or more of sender mobile device 110, sender financial account server 130, or payment management server 150. For exemplary purposes, FIG. 14 is described as being performed by sender mobile device 110.

Sender mobile device 110 (via processor 202, payment application 300, or QR generator module 302), may, after recognizing that optional additional security in a QR code (such as QR code 500) is requested, determine identification information associated with the sender (Step 1410). The information may comprise, for example, the name, mailing address, email address, or telephone number of the sender. The information may further comprise information associated with the sender's financial account, such as the name of the financial account provider that configured the account, the account number, the balance of the selected account before and/or after the transaction, etc. It is understood that the information described above is a non-limiting example, and that more or less information may be determined for a particular sender and/or a particular transaction. The information may be determined and gathered from a number of sources, such as memory 204 of sender mobile device 110, memory devices (such as memory 404 and database 406) associated with payment management server 150, memory devices associated with sender financial account server 130 (not shown), or other data sources via network 120.

Sender mobile device 110 may configure a software object, or "transaction token," comprising the determined sender identification information (Step 1420). In some embodiments, the transaction token may be configured as an application programming interface. The transaction token may be configured to provide identity and security information relating to the financial transaction and/or the sender to other components of system 100, such as recipient mobile device 112, sender financial account server 130, recipient financial account server 140, and/or payment management server 150. In some embodiments, the transaction token may comprise additional software modules relating to security, such as a Secure Sockets Layer (SSL) certificate. The purpose of the certificate is to identify the sender and provide enhanced security for consumer data. As part of one or more "handshakes" over network 120 between sender mobile device 110 and other components of system 100, one or more systems may require that the sender mobile device 110 provide a secure certificate to verify sender identity. Although in preferred embodiments the verification is achieved via a certificate configured using SSL technology, it is understood that sender mobile device 110 may employ any like technology providing secure verification of identity.

Sender mobile device 110 may configure access to the transaction token (Step 1430). In some embodiments, the transaction token may be directly readable within QR code 500 by the other computing systems of system environment 100. In other embodiments, QR 500 may contain a link providing remote access to the transaction token information via network 120, such as via the World Wide Web or other Internet protocol.

The information contained within the transaction token is invariably sensitive, private information and, before the transaction token leaves the secured environment of sender mobile device 110, certain additional access steps may be configured to help ensure that unauthorized parties are not able to access, view, and use the information. In some embodiments, sender mobile device 110 (via payment application 300 or QR generator module 302) may configure additional encryption for the transaction token. In other embodiments, sender mobile device 110 may implement a password protection scheme for the transaction token. In these embodiments, the password protection scheme may further comprise configuring and implementing additional security questions to further limit access. In some embodiments, sender mobile device 110 may generate terms of service or other similar security and usage agreements, and require acknowledgement of the terms of service by other system components of system environment 100.

The transaction token may be configured with one or more layers of required authorization (for example, using the OAuth 2 standard), and may require verification by one or both of sender mobile device 110 or the external system attempting to read the transaction token to display or access authorization data contained within the transaction token. Sender mobile device 110 may configure the transaction token so the information contained within the transaction token cannot be downloaded by any end user. In some embodiments, the configured transaction token security credentials may include biometric or other physical characteristics to access the authorized data or functions. In other embodiments, the credentials may include physical devices required for access, such as a key, dongle, card, or other such device. Sender mobile device may further configure the transaction token to operate under Hypertext Transfer Protocol Secure (HTTPS) or other comparable security protections over network 120.

Sender mobile device 110, via QR generator module 302, may configure the display of the transaction token (or, as described above, a link to the transaction token information) within the visual bit configuration of the generated QR code, such as QR code 500 (Step 1440). QR generator module 302 may determine the size of the transaction token, and may reconfigure the visual appearance of the generated QR code 500 to incorporate the additional information required for the transaction token. Following the incorporation of the transaction token into the design of the code, QR generator module 302 may re-generate and/or re-display the code on display 206 of sender mobile device 110 as necessary.

Figure 15:
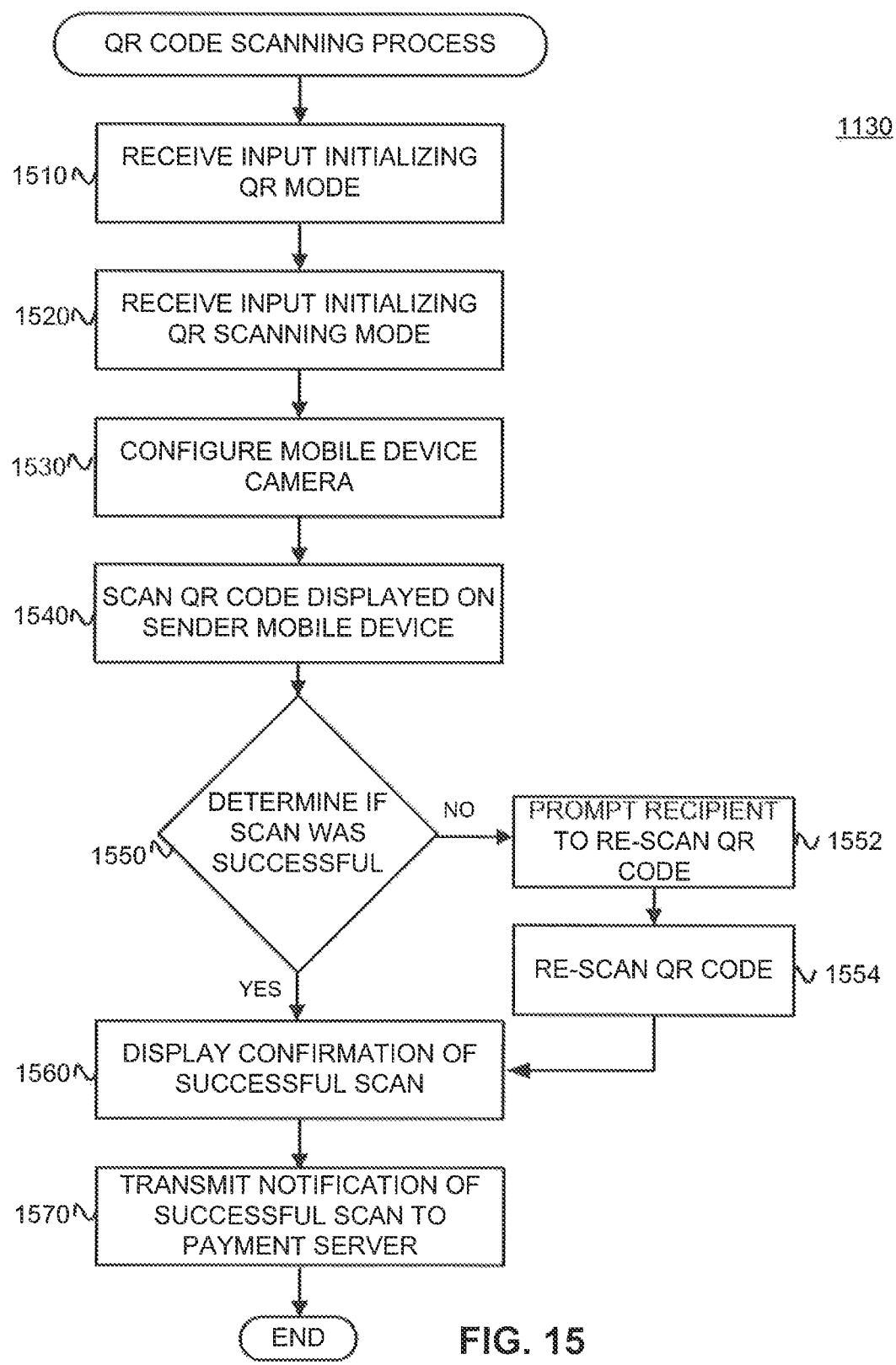
FIG. 15 is an example of a QR code scanning process.

FIG. 15 illustrates a QR code scanning process (corresponding to step 1130 of process 1100 disclosed above) consistent with certain disclosed embodiments. Process 1130, as well as any or all of the individual steps therein, may be performed by any one or more of sender mobile device 110, recipient mobile device 112, sender financial account server 130, recipient financial account server 140, or payment management server 150. For exemplary purposes, FIG. 15 is described as being performed by recipient mobile device 112.

Recipient mobile device 112, via payment application 300 and/or QR scanner module 304, may receive an input initializing a QR mode (Step 1510). In some embodiments, the user of recipient mobile device 112 may provide the input by selecting or otherwise engaging a link, button, icon, or other graphical element incorporated within a graphical user interface displayed on display 206, such as those described above in association with FIGS. 6-7. For example, the received input may comprise a press input on the "Use QR" icon illustrated in the example user interface illustrated in FIG. 6. Those of ordinary skill of the art may readily contemplate other means for initiating a QR mode, either within payment application 300 or through other means. For example, in one embodiment a user may activate the QR mode by saying "QR mode" into a microphone (not shown) associated with recipient mobile device 112.

Recipient mobile device 112, via payment application 300 and/or QR scanner module 304, may receive an input initializing a QR scanning mode (Step 1520). Much as described above, in some embodiments, the user of recipient mobile device 112 may provide the input by selecting or otherwise engaging a link, button, icon, or other graphical element incorporated within a graphical user interface displayed on display 206, such as those described above in association with FIGS. 6-7. For example, the received input may comprise a press input on the "Redeem a Friend's QR" icon illustrated in the example user interface illustrated in FIG. 7. Those of ordinary skill of the art may readily contemplate other means for initiating a QR scanning mode, either within payment application 300 or through other means. For example, in one embodiment a user may activate the QR scanning mode by saying, for example, "QR scan" into a microphone (not shown) associated with recipient mobile device 112.

Recipient mobile device 112 may configure hardware and/or software elements of camera 200 to prepare for the QR scanning process (Step 1530). For example, in some embodiments, based on the physical location of recipient mobile device 112, QR scanner module 304 may configure software and/or hardware of camera 200 to provide additional light, such as through a flash (not shown), or may require focusing of the camera's lens. In some embodiments, QR scanner module 304 may configure and display a user interface to be displayed on display 206 showing the view from one or more of camera 200's lens(es). QR scanner module 304 may additionally provide a visual guide to the recipient to aid in alignment and capture of a QR code such as QR code 500, such as a box, crosshairs, or other similar guides.

QR scanner module 304 may scan a QR code, such as QR code 500, displayed on display 206 of sender mobile device 110 (Step 1540). In some embodiments, QR scanner module 304 may be configured to automatically scan QR code 500 when positioned within the view of camera 200. For example, in some embodiments, the QR code 500 may be automatically scanned when it is positioned and focused within a guide on display 206 of recipient mobile device 112, such as those described above. In other embodiments, the recipient may need to take an affirmative action to scan the code, such as pressing a button on display 206 or elsewhere on recipient mobile device 112.

QR scanner module 304 may determine whether or not the scan of the intended QR code 500 was successful (Step 1550). If the scan was not successful (for example, if elements of code 500 were not readable, if the camera 200 malfunctioned, if there was a disruption in network 120, etc.) (Step 1550: NO), QR scanner module 304 may prompt the recipient to attempt to rescan QR code 500 (Step 1552). The prompt may be a visual prompt displayed on display 206 of one or both of sender mobile device 110 or recipient mobile device 112. The recipient may then re-scan QR code 500, substantially as described above in Steps 1510-1540 (Step 1554).

Once the scan of QR code 500 is successful (Step 1550: YES, or successful scanning at Step 1554), one or both of sender mobile device 110 or recipient mobile device 112 may generate and display a confirmation message indicating the successful scan (Step 1560). In some embodiments, the confirmation message may be presented as part of a graphical user interface substantially similar to the interface illustrated in FIG. 10 described above. In some embodiments, as shown in FIG. 10, one or both of the sender and recipient may be provided with additional options associated with the transaction, including but not limited to performing a new QR code payment transaction or reversing the just-completed transaction. In some embodiments, one or both of sender mobile device 110 and recipient mobile device 112 may transmit notification of the successful scan to payment management server 150 (Step 1570). The notification may be a textual summary of the transaction, or it may comprise visual indicia of the transaction, such as a copy of the scanned code, a copy of the confirmation screen shown to the sender and recipient, etc. In some embodiments, payment management server 150 is further configured to receive the transmitted confirmation notification and further relay the confirmation to one or both of sender financial account server 130 and recipient financial account server 140. Such a transmission, including further details relating to processing of the transaction, will now be described in detail.

Figure 16:
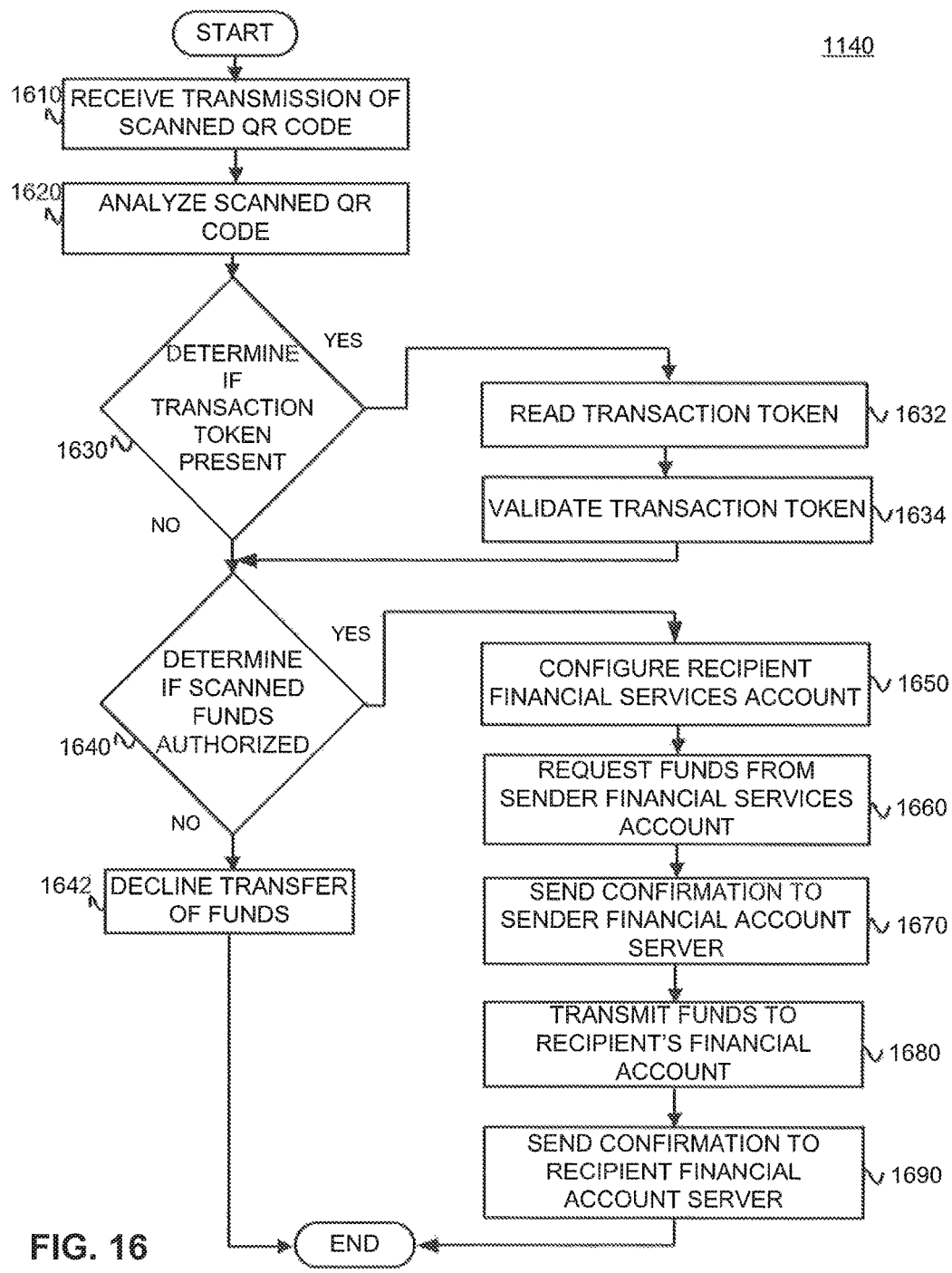
FIG. 16 is an example of a process for processing a financial transaction using a QR code.

FIG. 16 illustrates a QR code redemption process (corresponding to Step 1140 of process 1100 disclosed above) consistent with certain disclosed embodiments. Process 1140, as well as any or all of the individual steps therein, may be performed by any one or more of sender mobile device 110, recipient mobile device 112, sender financial account server 130, recipient financial account server 140, or payment management server 150. For exemplary purposes, FIG. 16 is described as being performed by payment management server 150.

Payment management server 150 may receive a transmission of a scanned QR code (Step 1610). In some embodiments, this transmission may be the same or substantively similar as the confirmation transmission discussed above in association with Step 1570 of QR code scanning process 1130. In some embodiments, payment management server 150 may receive the scanned QR code 150 itself. In other embodiments, payment management server 150 may receive a summary notification of the information embedded within QR code 500.

Payment management server 150 may analyze the scanned QR code (Step 1620). As discussed above, in embodiments where payment management server 150 receives the entire QR code 500, payment management server, via processor 400, may read and decipher the information embedded within the code. In alternative embodiments, where an intermediary entity (not shown) reads the QR code 500 itself, payment management server 150 via processor 400 may read and analyze any summary information of the associated code information received from the intermediate entity.

In some embodiments, analysis of QR code 500 may reveal that it contains a transaction token, such as that discussed above in association with FIGS. 13 and 14. Payment management server 150 may determine whether such a transaction token is embedded within QR code 500 (Step 1630). If a transaction token is present (Step 1630: YES), payment management server 150, via processor 400, may read the transaction token and determine the information contained within it (Step 1632).

Payment management server 150 may validate the information contained with the transaction token (Step 1634). Payment management server 150 may validate the information by comparing it to information contained on one or more of sender financial account server 130 or recipient financial account server 140. If the information matches, the process proceeds. In some embodiments, if the information on the transaction token does not match or otherwise cannot be validated, payment management server 150 may decline to transfer the funds. Alternatively, payment management server 150 may transmit a notification comprising information about the failed transaction token validation to one or more of sender mobile device 110, recipient mobile device 112, sender financial account server 130, and recipient financial account server 140. In these embodiments, the notification may contain information relating to the failed transaction token validation, and may prompt one or both of the sender or recipient to attempt the QR code scanning process again.

If a transaction token is not present (Step 1630: NO), or if a transaction token is present and validated in Step 1634, payment management server 150 may determine if the amount 506 contained within the scanned QR code 500 is an amount authorized for transfer (Step 1640). In some embodiments, payment management server 150 may determine if the scanned funds are authorized by sending a query or other such notification to sender financial account server 130. In alternative embodiments, payment management server 150 may send a confirmatory notification or query directly to sender mobile device 110, comprising, for example, a message stating "Send $X.XX to [Recipient]?", with $X.XX comprising amount 506.

In some embodiments, payment management server 150 may determine that funds in the amount of amount 506 are not authorized for transfer (Step 1640: NO). In these embodiments, payment management server 150 may decline the transfer of funds (Step 1642). In some embodiments, payment management server 150 may transmit a notification comprising information about the failed authorization to one or more of sender mobile device 110, recipient mobile device 112, sender financial account server 130, and recipient financial account server 140. In these embodiments, the notification may contain information relating to the failed transaction, and may prompt one or both of the sender or recipient to attempt the QR code scanning process again.

If payment management server 150 does determine that the funds are authorized for transfer (Step 1640: YES), payment management server 150 may configure the recipient financial services account to begin the funds transfer (Step 1650). The configuration may comprise any steps necessary to prepare the recipient's account to receive the funds, and may require one or more communications between payment management server 150 and recipient financial account server 140. For example, payment management server may contact financial account server 140 requesting authorization to transfer funds in the amount of amount 506 from sender financial account server 130.

Payment management server 150 may request funds in the amount of amount 506 from the sender's financial account (Step 1660). For example, in some embodiments, the sender's financial account may be maintained by a financial institution associated with sender financial account server 130 and/or payment management server 150. The funds being transferred may be in the amount 506 specified in the scanned QR code 500. In alternative embodiments, as discussed previously, the transferred amount may comprise amount 506 plus an additional amount of funds comprising service fees, taxes, etc. In some embodiments, payment management server 150 may direct the sender's financial institution via sender financial account server 130 to transfer the requested funds to the recipient's financial institution, via recipient financial account server 140. In these embodiments, the request may comprise account information pertaining to both the sender and recipient's financial accounts (e.g., account numbers) and the amount of the transfer.

Payment management server 150 may send a confirmation of the withdrawal of the transferred funds to sender financial account server 130 (Step 1670). The confirmation may comprise a textual notification comparable to a receipt, listing the time and date of the transaction, the transferred amount, and the destination account of the transfer (for example, an account hosted on recipient financial account server 140). Payment management server 150 may facilitate the actual transfer of the funds to the recipient's financial account, in conjunction with sender financial account server 130 (Step 1680). The transfer may occur substantially simultaneously to the scanning of the QR code and the transmission of the request to sender financial account server 130, or it may occur at a later time. After transfer of the funds, recipient financial account server 140 may confirm receipt of the transferred funds to one or both of payment management server 150 and sender financial account server 130. Payment management server 150 may then send a confirmation of the completed transaction to recipient financial account server 140 (Step 1690). The confirmation may occur through various means, for example, per the means and processes described previously in step 1670.

The embodiments disclosed herein may provide a simple and secure way to initiate a P2P payment transaction using mobile devices. By using value-added QR codes, a sender may initiate a fund transfer without exchanging sensitive financial account information, such as a bank account or credit card number. Additionally, the disclosed embodiments may allow parties to accomplish P2P payment transactions more rapidly than through traditional payment techniques (e.g., providing a check to a recipient who must then cash the check to receive payment). That is, funds transfers may be completed due to the exchange of a scannable QR code from sender to recipient. Furthermore, the recipient and/or sender in a P2P payment transaction according to the disclosed embodiments may know that a fund transfer from the sender's financial institution to the recipient's financial institution has been initiated. Furthermore, the disclosed embodiments provide sender and recipient with the ability to retain a record of the payment transaction.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. For example, the described implementations may include software, but systems and methods consistent with the disclosed embodiments may be implemented as a combination of hardware and software, or in hardware alone. Examples of hardware include computing or processing systems, including personal computers, servers, laptops, mainframes, micro-processors and the like. Additionally, although aspects of the disclosed embodiments are described as being stored in memory, one skilled in the art will appreciate that these aspects can also be stored on other types of computer readable media, such as secondary storage devices, for example, hard disks, floppy disks, or CD ROM, or other forms of RAM or ROM, USB media, DVD, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets. One or more of such software sections or modules can be integrated into a computer system or existing e-mail or browser software.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed routines may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented method, comprising:
   determining, by a processor of a mobile device, a funding financial account for a payment transaction;
   receiving, by the processor, a user input comprising a payment amount for the payment transaction;
   determining, by the processor, identification information associated with a user of the funding financial account;
   determining, by the processor, that additional security is to be used in the payment transaction;
   configuring, by the processor based on the additional security determination, a transaction token incorporating the determined identification information;
   generating, by the processor, a QR code comprising a representation of the payment amount, the transaction token, and an application identifier associated with a payment application of the mobile device used to generate the QR code;

displaying, by the processor, the QR code on a display of the mobile device; and transmitting, by the processor, a notification indicating the generation of the QR code to a server, the notification including an image of the QR code.

2. The method of claim 1, further comprising:
receiving, by the processor, a notification that the funding financial account contains funds equal to or greater than the received payment amount.

3. The method of claim 1, wherein the notification comprises one or more of the payment amount, the identity of the user associated with the funding financial account, the identity of a user intended to receive the payment, or the date and time that the QR code was generated.

4. The method of claim 1, further comprising:
determining that the user requests to add a memo field to the QR code; and
determining that the user requests to configure the mobile device to print the QR code or email the QR code to another user.

5. The method of claim 1, further comprising:
detecting, by the processor, a location of the mobile device; and
requesting, by the processor, additional security for the QR code based on the detected location of the mobile device.

6. The method of claim 1, further comprising:
determining that a user associated with the funding financial account requests additional security for the transaction;
determining, in response to the request for additional security, information associated with the user, wherein the additional information includes biometric verification credentials for a user associated with the funding financial account.

7. The method of claim 1, further comprising:
determining, based on a creditworthiness of the user associated with the funding financial account, that a user associated with the funding financial account requests additional security for the transaction.

8. The method of claim 1, wherein the funding financial account comprises one of a credit account or a debit account.

9. A mobile device, comprising:
a display;
a memory storing instructions; and
a processor configured to execute the instructions to:
determine, by the processor, a funding financial account for a payment transaction;
receive, by the processor, a user input comprising a payment amount for the payment transaction;
determine, by the processor, identification information associated with a user of the funding financial account;
determine, by the processor, that additional security is to be used in the payment transaction;
configure, by the processor based on the additional security determination, a transaction token incorporating the determined identification information;
generate, by the processor, a QR code comprising a representation of the payment amount, the transaction token, and an application identifier associated with a payment application of the mobile device used to generate or display the QR code;
display, by the processor, the QR code on the display; and
transmit, by the processor, a notification indicating the generation of the QR code to a server, the notification including an image of the QR code.

10. The mobile device of claim 9, wherein the processor is further configured to execute the instructions to:
receive a notification that the funding financial account contains funds equal to or greater than the received payment amount.

11. The mobile device of claim 9, wherein the notification comprises one or more of the payment amount, the identity of a user associated with the funding financial account, the identity of a user intended to receive the payment, or the date and time that the QR code was generated.

12. The mobile device of claim 9, wherein the processor is further configured to execute the instructions to:
determine that the user requests to add a memo field to the QR code; and
determine that the user requests to print the QR code or email the QR code to another user.

13. The mobile device of claim 9, wherein the processor is further configured to:
detect a location of the mobile device; and
request additional security for the QR code based on the detected location of the mobile device.

14. The mobile device of claim 9, wherein the processor is further configured to:
determine that a user associated with the funding financial account requests additional security for the transaction;
determine, in response to the request for additional security, information associated with the user, wherein the additional information includes biometric verification credentials for a user associated with the funding financial account.

15. The mobile device of claim 9, wherein the processor is further configured to:
determine, based on a creditworthiness of the user associated with the funding financial account, that a user associated with the funding financial account requests additional security for the transaction.

16. The mobile device of claim 9, wherein the funding financial account comprises one of a credit account or a debit account.

* * * * *